INVENTOR.
ROSCOE H. SMITH
LLOYD E. MILLER
LEON M. DUNNING

Patented June 19, 1945

2,378,444

UNITED STATES PATENT OFFICE 2,378,444

ELECTRICAL CONTROL SYSTEM

Roscoe H. Smith and Lloyd E. Miller, Cleveland, Ohio, and Leon M. Dunning, Boston, Mass., assignors to The Reliance Electric and Engineering Company Application August 17, 1940, Serial No. 353,102

25 Claims. (Cl. 101—178)

Our invention relates in general to electrical control systems and more particularly to electrical control systems for cloth printing machines.

In the printing of cloth, the previous practice has been to print each roll of the cloth by passing it through the print machine as an individual run. This necessitated the threading of each roll separately and constituted a serious handicap in obtaining high speed production. Printing speeds have also been slow for the reason that linear speeds for printing the cloth have been limited for most work to about 80 or 90 yards per minute, because beyond this speed of operation many troubles were experienced which seemed to make higher speeds impractical. However, new developments in the design of cloth printing machines, as well as the use of new inks and the employment of many other improved factors now make it practical to operate a cloth printing machine as high as 200 to 300 yards per minute. Of the new factors which had to be solved in speeding up printing production, the electrical control system for the entire machine stands out as one of the major improvements and constitutes the subject matter of this application. Our electrical control system not only gives great flexibility but also makes it possible to eliminate the time lost in starting or threading each new roll of cloth in order to obtain the full benefit of the higher operating speed.

The cloth to be printed is unwound from a supplying reel onto an accumulating conveyor designated in the trade as a scray device. The accumulated cloth is then withdrawn from the scray device and after passing over a dancer roll and a group of tension rolls enters the print machine where it travels in contact with a number of engraving rolls around the circumference of a large print machine cylinder. The cloth after it is printed is then directed to a plurality of drying cylinders which are called in the trade "main cans" or "piece good cans" from which the finished cloth is then pulled by a folding device which delivers the finished printed cloth into carts or boxes. The accumulating conveyor or scray device may be so designed as to permit the building up of enough cloth ahead of that taken away by the printing machine cylinder to completely unwind one roll and attach to its end the start of a fresh roll, thereby insuring continuous operation of the machine. At the folding device, as each seam comes along, the cart or box being filled is pushed forward and the cloth is folded into another box or cart brought under the folding device, leaving the seam between the boxes or carts to be cut later.

Next to the cloth being printed, but between it and the main printing machine cylinder, is a web of cloth commonly known as the "back grey". This cloth is the full width of the engraving or printing rolls and takes up the ink on the ends of the engraving rolls beyond the selvage of the cloth being printed. The main purpose of the grey back is to keep the ink from being deposited on a blanket which is next to the grey back on the large printing cylinder. The grey back is unwound from a supply roll and pulled directly into the cloth printing machine from which it travels over a set of drying cylinders or cans, known as the grey back cans. The end of the grey back which is threaded through the machine is fixed or connected to the cloth coming from the unwinding supply roll, thus forming a continuous or endless back grey. At the end of the printing run, as the last roll of cloth to be printed is being passed through the printing machine, the seam in the grey back is cut open and the grey back is wound up on a smaller winder called a batcher device.

The main drive for the cloth printing cylinder is applied to the several engraving rolls by a suitable gearing arrangement. The pressure of the engraving rolls on the large printing cylinder drives the latter by friction. In actual practice the circumferences of the engraving rolls vary between 16 inches to 24 inches for different lengths of patterns being printed. Accordingly, the linear speed of the printing machine cylinder varies from a given speed of the main drive, depending upon the circumferences of the engraving rolls. At the maximum linear speeds the drive is designed to provide at least 300 yards per minute, which is made available even with the minimum size engraving rolls; namely, the 16 inch circumference rolls, and at the minimum linear speeds the drive is designed to give as low as 10 yards per minute for threading or matching-up purposes, which is made available with the maximum size engraving rolls; namely, the 24 inch circumference rolls. Although this appears to be a 30 to 1 speed range, it is actually 45 to 1 by reason of the variations in the diameters of the engraving rolls. In threading the machine, the operator may run it at a low speed either by setting the electrical control at "run slow" condition or by jogging the machine by using the "jog" control arrangement. For production printing speeds the operator operates the machine under "run fast" condition. In addition to the separate main drive which drives the printing machine cylinder, individual sectional drives are applied to the other driven parts of the entire machine.

An object of our invention is to provide for operating the entire machine over a wide range of speeds, in such a manner as to have sufficient power available to make the operation positive and reliable at any speed.

Another object of our invention is to provide for operating the machine under three distinct operating conditions; namely, that is to operate the machine under a jogging condition, under a run slow condition, or under a run fast condition.

Another object of our invention is to preselect the speed at which the entire machine will run under the run fast condition.

Another object of our invention is the provision of bringing the machine to a stop by first transferring from the run fast condition to the run slow condition and then transferring from the run slow condition to the stop condition.

Another object of our invention is the provision of bringing the machine to a rapid stop without passing through the run slow condition.

Another object of our invention is to provide for selectively energizing the main motor which drives the engraving rolls and the printing cylinder from a low voltage and a normal voltage generator to obtain the wide speed variations.

Another object of our invention is to provide for electrically energizing the main motor from the low voltage generator under the jogging condition or under the slow run condition and to provide for energizing the main motor from the normal voltage generator under the higher speeds of the fast run condition.

Another object of our invention is to provide for preventing the main driving motor from being subjected to an electrical jar upon the transition from the low voltage generator to the normal voltage generator.

Another object of our invention is to provide for making the transition from the low voltage generator to the normal voltage generator, and vice versa, at a point or condition where the voltages of the two generators are relatively close together.

Another object of our invention is to provide for making the transition from the low voltage generator to the normal voltage generator, and vice versa, at a point or condition where the voltages of the two generators are relatively close together while the voltages of both generators are changing.

Another object of our invention is to provide a wide speed variation under the run fast condition by varying the field excitation of both the main driving motor and of the normal voltage generator.

Another object of our invention is the provision of a sectional electrical drive for the entire machine whereby the various elements may be operated individually or in unison.

Another object of our invention is to make the motor which drives the main printing cylinder to be governed by the speed of another motor of the sectional drive in order to compensate automatically for different diameters of the engraving rolls.

Another object of our invention is the provision of energizing the main motor from a generator source different from the generator source employed to energize the other sectionalized motors.

Another object of our invention is the provision of energizing the main motor from a generator source different from the generator source employed to energize the other sectionalized motors, in order that the speed of the main motor may be varied both by the voltage impressed upon its armature and by its field excitation without disturbing the speed of the other sectionalized motors.

Another object of our invention is the provision of energizing the main motor from a generator source different from the generator source employed to energize the other sectionalized motors in order that a heavy or a light load on the printing cylinder does not disturb the voltage impressed upon the other sectionalized motors.

Another object of our invention is to make the motor which drives the "main drying cans" to be the "master" or "lead" section of the sectional electric drive.

Another object of our invention is to govern the lineal speeds of the printing cylinder in accordance with the lineal speed of the main drying can by an electrical synchronous interlock having in combination therewith a differential regulator which influences the speed of the main motor driving the printing cylinder.

Another object of our invention is the provision of adjusting the tension of the printed cloth between the printing cylinder and the main drying can by shifting the relationship existing between the electrical synchronous interlock and the differential regulator.

Another object of our invention is to provide for varying the speed of some of the sectional motor drives by means of a buck-and-boost generator governed by a dancer roll rheostat.

Another object of our invention is to provide for varying the speed of some of the sectional motor drives by means of a buck-and-boost generator.

Another object of our invention is to provide for controlling the speed of some of the sectional drive through a buck-and-boost generator and a dancer roll rheostat in which the rheostat influences the field of both the buck-and-boost generator and the motor which is connected in circuit relation with the buck-and-boost generator.

Other objects and a fuller understanding of our invention may be had by referring to the following description and claims, taken in conjunction with the accompanying drawings, in which:

Figure 1:
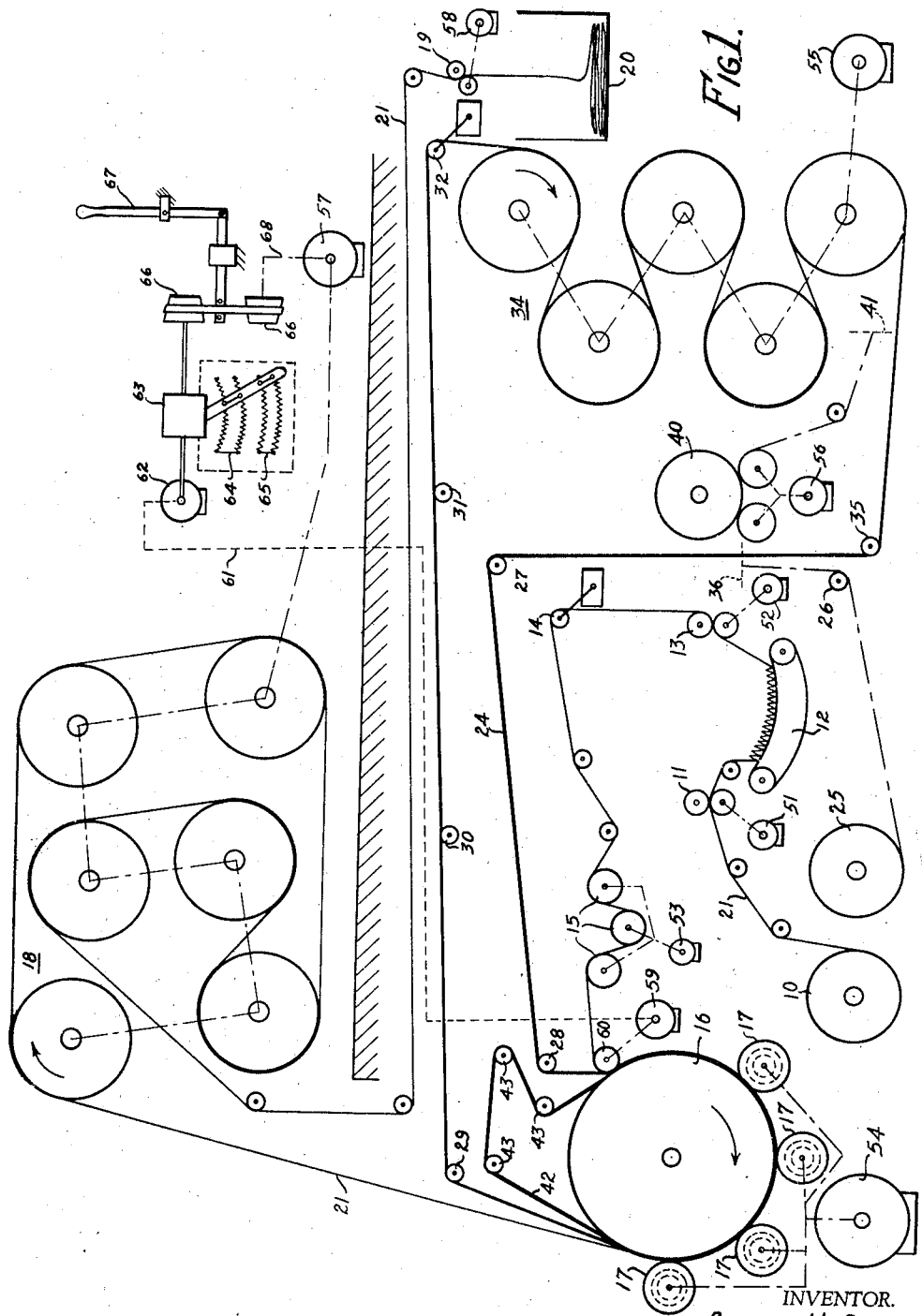
Figure 1 represents a diagrammatic side elevational view of a complete cloth printing machine, showing the travel of the cloth being printed, the grey back, and the blanket, together with the electric motors for driving the various elements.

With reference to Figure 1 of the drawings, the cloth to be printed, being designated by the reference character 21, is supplied upon an unwinding reel 10 from which the cloth is withdrawn by a pair of first pull rolls 11 upon a scray device 12 where the unwound cloth is permitted to accumulate. From the scray device the cloth is withdrawn by means of a second pair of pull rolls 13 from which the cloth travels over a dancer roll rheostat 14 into a system of tension rolls 15 from which the cloth enters the printing cylinder 16. The cloth, as it passes around the printing cylinder 16 is brought into contact with the engraving or printing roll 17 which print the pattern or design upon the cloth. The printed cloth upon leaving the printing cylinder 16 passes upwardly to a system of drying cylinders 18 which are generally referred to in the trade as main cans and which are located overhead in a balcony or on an upper floor. After the printed cloth is dried by the main cans it passes over a number of rollers to a pair of folding rolls 19 which convey the printed finished material into a box or carton 20. The accumulating conveyor or scray device 12 may be designed so as to permit the building up of enough cloth ahead of that being taken by the printing cylinder to completely unwind one roll so that a fresh or new roll may be put on the supply reel with the end of the cloth of the fresh reel stitched to the end of the cloth on the scray device, thereby insuring continuous operation of the machine. The scray device comprises, briefly, an endless conveyor which rotates or runs around two spaced rollers so that as the cloth is accumulated thereon the weight of the cloth tends to drive the endless conveyor about the two spaced rolls. As an alternative, the conveyor may be driven slowly by some external means. At the folding rolls 19, as each seam comes along, the cart or box being filled is pushed forward and the cloth is folded into another box or cart brought under the folder, leaving the seams between the boxes to be cut apart later.

Next to the cloth being printed, but between it and the main printing machine cylinder, is the web of grey back which is indicated by the reference character 24. This cloth is the full width of the engraving or printing rolls 17 and takes up the ink on the ends of the engraving rolls beyond the selvage of the cloth being printed. The main purpose of the grey back is to keep this ink from being deposited on a blanket designated by the reference character 42 which is next to the grey back on the large printing cylinder 16. The blanket is next to the printing cylinder 16 and runs around the rollers 43. In threading the grey back, it is unwound from a supply reel 25 and passed over a plurality of spaced rolls 26, 27 and 28 and then around the printing cylinder 16 from which it passes over a series of spaced rolls 29, 30 and 31 to a dancer roll rheostat 32. The grey back then passes over a system of drying cylinders 34 which are generally known in the trade as back grey cans. The forward or threaded end of the gray back after passing over the grey back cans 34 is carried under a roll 35 up to a point in the neighborhood of the dotted line 36. Then the operator cuts the grey back material coming from the supply reel 25 at the dotted line 36 and stitches the two adjacent ends of the grey back together to make an endless strip of material which runs continuously between the printing cylinder 16 and the grey back cans 34 as the printing machine is in operation. At the ends of the printing run, as the last roll of cloth to be printed is being fed through the printing machine, the stitched seam in the grey back is cut open at a point in the neighborhood indicated by the dotted line 41 and the forward end of the grey back is then threaded into a batcher device 40 where it is wound on a take-up reel, after which the grey back may be taken away and cleaned or washed so that it may again be put upon the supply reel 25 for another period of operation.

The electric motors for driving the first and second pair of pull rolls 11 and 13, the tension rolls 15, the engraving rolls 17 and the printing cylinder 16, the grey back cans 34, the batcher device 40, the main cans 18, and the folding rolls 19 are represented respectively by the reference characters 51, 52, 53, 54, 55, 56, 57 and 58. That is to say, each unit or element of the complete printing machine has its own individual driving motor, constituting a sectionalized electrical system of operation. The motor 54 is designated as the main motor drive and is arranged to be suitably geared to drive the several engraving rolls 17 which in turn drive the printing cylinder 16 by frictional engagement. The circumferences of the engraving rolls 17, as illustrated by the dotted circles, may vary between 16 inches and 24 inches for different lengths of patterns being printed. Accordingly, the lineal speed of the printing cylinder varies for a given speed of the main driving motor 54, depending upon the circumference of the engraving rolls. In actual operation the speed of the main driving motor is arranged to provide at least 300 yards per minute as the maximum speed and this is made available even with 16 inch circumference rollers. A speed in the neighborhood of 10 yards per minute is arranged for threading or matching-up purposes, and this is obtainable even with the 24 inch circumference rolls. This actually sets up a 45 to 1 speed range, due to driving through the variable diameter engraving rolls.

In our electrical control system, the main can motor 57 is the "master" or "lead" section of the sectionalized electrical drive. In order to keep the lineal speed of the printing cylinder 16 and the lineal speed of the main can 18 in unison or in synchrony, the speed of the main driving motor 54 is governed in accordance with the lead or master motor 57 that drives the main cans 18. The synchronizing of the lineal speed of the printing machine cylinder 16 with the lineal speed of the main cans 18, is accomplished by the employment of a synchronous transmitter 59 which is driven in response to the lineal speed of the printing cylinder 16 by a roll 60, a synchronous receiver 62 which is electrically connected to the synchronous transmitter 59 as indicated by the dotted line 61, a differential regulator 63 having variable resistor units 64 and 65 which electrically affect the voltage impressed upon the armature of the main motor 54 and the excitation of the field of the main motor 54, and a variable system of pulleys 66 interconnected by a belt governed by a belt-shifting lever 67. By the foregoing arrangement, one side of the differential regulator 63 is driven by the synchronous receiver 62, being responsive to the lineal speed of the printing cylinder 16 through the synchronous transmitter 59, and the other side of the differential regulator 63 is driven by the motor 57 through the drive indicated by the dash-dot line 68 and the variable pulleys 66. In the event that the lineal speed of the printing cylinder 16 tends to depart from the lineal speed of the main cans 18, the differential regulator 63 is immediately operated to vary the speed of the main driving motor 54 to bring the linear speed of the printing cylinder 16 in synchrony with that of the main cans 18. The shifting of the belt upon the variable pulleys 66 takes care of regulating the tension or draw between the printing cylinder 16 and the main cans 18. By making the motor 57 driving the main cans as a master or lead motor, no additional provisions need be made to take care of variations in speed of the main printing cylinder 16 incident to changing the engraving roll 17 to different diameters. Accordingly, the combination of the synchronous transmitter and receiver, the differential regulator and the system of variable pulleys 66 give complete speed control over the lineal speed of the printing cylinder 16 regardless of the diameters of the engraving rolls 17.

The dancer roll rheostat 14 is arranged to govern the speed of the pair of second pull rolls 13 withdrawing the material from the scray device, and similarly the dancer roll rheostat 32 is arranged to govern the speed of the motor 55 driving the back grey cans 34. The terms "synchronous transmitter" and "synchronous receiver" as used herein are applied to a condition where two slip ring motors of the same number of poles have their primaries connected to the same source of alternating current power and have their secondaries interconnected in the proper phase relation, so that any movement of the rotor of one will result in an exact proportional movement of the rotor of the other. The one which has its rotor moved by an outside force is the synchronous transmitter and the one which has its rotor to electrically follow the motion of the former is the synchronous receiver.

Figure 2:
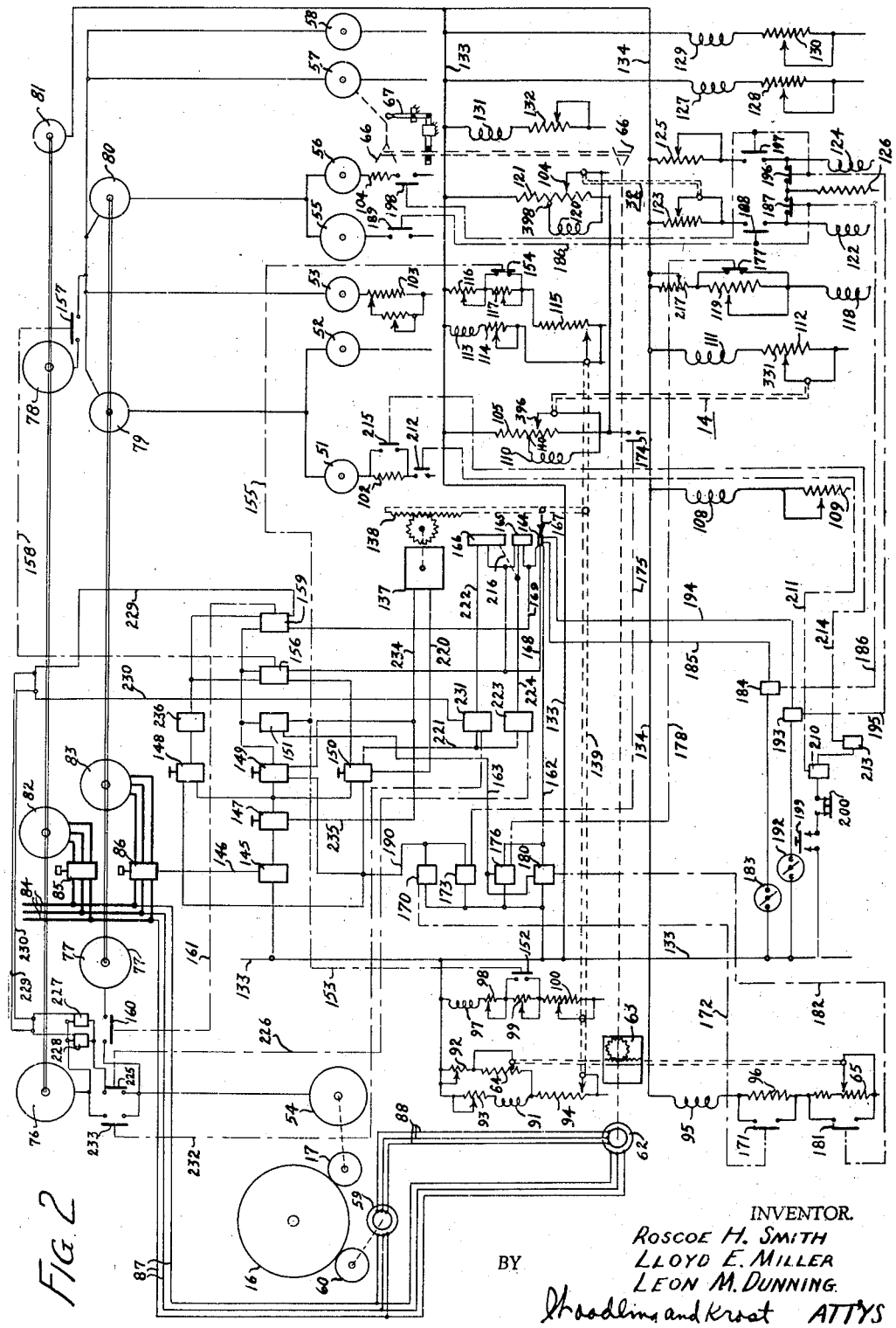
Figure 2 represents a single line electrical diagram of the control system in which the blocks represent diagrammatically a grouping of the various control elements which govern the operation of the electric equipment.

With reference to Figure 2 of the drawings, which is a single line representation showing diagrammatically the electrical control system, the armature of the main driving motor 54 is arranged to be selectively energized from either a main generator 76 or a threading generator 77. An auxiliary generator 78 is arranged to electrically energize the armature of the motors 51, 52, 53, 55, 56, 57, and 58. The armature of a buck-and-boost generator 79 is connected in series with the armatures of the motors 51 and 52, which drives respectively the first and second pairs of pull rolls 11 and 13 and the armature of a buck-and-boost generator 80 is connected in series with the armatures of the motors 55 and 56 which drive respectively the grey back cans 34 and the batcher device 40. An exciter 81 supplies field excitation to the several fields of the various motors and generators as well as the control relays shown in block form, through the line conductors 133 and 134. The main generator 76, the auxiliary generator 78 and the exciter 81 are driven through mechanical means by an alternating current motor 82 which is energized from an alternating current supply source 84 upon the closing of a contactor 85. The threading generator 77 and the two buck-and-boost generators 79 and 80 are driven through mechanical means by an alternating current motor 83 which is energized from the alternating current supply source 84 upon the closing of the contactor 86. The primary of the synchronous transmitter 59 and of the synchronous receiver 62 are energized through the three alternating current conductors 87. The secondary of the synchronous transmitter 59 and of the synchronous receiver 62 are connected together by the three wires identified by the reference character 88. Inasmuch as Figure 2 is a diagrammatic single-line drawing of the electrical system, we have placed the fields for the various motors and generators in substantially a vertical line below the respective motors and generators. In accordance with this plan, the field for the main generator 76 is indicated by the reference character 91 and the field for the main motor 54 is designated by the reference character 95, the field 91 for the main generator being located above the field 95 for main motor 54 because the main generator 76 is located above the main motor 54. As illustrated, the field 91 of the main generator is governed by four resistors 64, 92, 93, and 94. The field 95 of the main motor 54 is governed by two resistors 65 and 96. The variable resistors 64 and 65 are governed by the differential regulator 63 so that the speed of the main motor 54 is varied in accordance with two different conditions; namely, the voltage of the main generator 76 incident to variations of the field excitation of the main generator 76 and of the field excitation of the motor 54. The variable resistors 64 and 65 are arranged such that at relatively low speeds the voltage of the main generator 76 is low and the field excitation of the motor 54 is high and such that at relatively high speed the voltage of the main generator 76 is relatively high and the field excitation of the motor 54 is relatively low. The variable resistor 94 in the field 91 of the main generator 76 is governer by a motor operated rheostat 137 which is set into operation by the actuation of the closing of the run fast relay 150 and circuits as shown by the block diagram.

The actuation of the motor actuated rheostat 137 operates a rack and pinion drive 138 which, as illustrated by the double dotted lines 139, actuates the variable resistor 94 to vary the field excitation of the main generator 76 and thus the generated voltage thereof which varies the speed of the main motor 54.

The field for the threading generator 77 is designated by the reference character 97 and is placed substantially vertically under the threading generator in Figure 2. The field 97 is governed by two adjustable resistors 98 and 99 and a variable resistor 100. As illustrated, the variable resistor 100 is governed by the motor operated rheostat 137, so that the voltage generated by the threading generator 77 is governed by the actuation of the motor operated rheostat 137. The field for the motor 51 driving the first pair of pull rolls 11 is designated by the reference character 108 and the excitation thereof is controlled by an adjustable rheostat 109. The field for the buck-and-boost generator 79 is identified by the reference character 110 and is governed by a variable resistor 105. The field for the motor 52 driving the second pair of pull rolls 13 is designated by the reference character 111 and is governed by a variable resistor 112. As illustrated in Figure 2 of the diagram, the variable resistor 105 and the variable resistor 112 are connected by two dash lines, indicated by the refererence character 14 which means that these two variable resistors are controlled by the dancer roll rheostat 14 over which the cloth passes upon leaving the second pair of pull rolls 13. Accordingly, movement of the dancer roll rheostat 14 not only changes the field excitation of the motor 52 to vary its speed but also varies the voltage generated by the buck-and-booster generator 79 to vary the voltage impressed upon the motor 52 and thus its speed. That is to say, the speed of the motor 52 is responsive to its own variable field excitation as well as to the variable voltage generated by the buck-and-boost generator 79, which modifies the voltage of the auxiliary generator 78 which is impressed upon the motor 52. When the arrow on the resistor 105 coincides with the middle point 140, no current flows through the field of the buck-and-boost generator 79 and thus no voltage is generated to modify the voltage of the auxiliary generator 78 impressed upon the motor 52. When the dancer roll rheostate 54 moves the arrow below the point 140, current flows through the field winding of the buck-and-boost generator 79 in such direction as to increase the voltage of the buck-and-boost generator 79 to impress an additional voltage upon the armature of the motor 52 to increase its speed, and at the same time the dancer roll rheostat 14 increases the resistance of the resistor 112 in the field 111 of the motor 52 to make the motor further increase in speed. When the dancer roll rheostat 14 moves the arrow above the point 140 upon resistor 105, the current in the field of the buck-and-boost generator 79 flows in a reverse direction to generate a voltage in opposition to the voltage generated by the auxiliary generator 78 to decrease the voltage impressed upon the motor 52 to reduce the speed thereof and at the same time the dancer roll rheostat 14 decreases the resistor 112 in the field 111 of the motor 52 to make the motor 52 run at a still slower speed. Accordingly, the speed of the motor 52 is not only affected by its field excitation 111 but also by the voltage impressed thereon as modified by the buck-and-boost generator 79. The variation of the buck-and-boost generator voltage is also impressed upon the motor 51 which varies the speed of the first pair of pull rolls 11 in accordance with the operation of the dancer roll rheostat 14.

The field for the auxiliary generator 78 is designated by the reference character 113 and the excitation thereof is governed by an adjustable resistor 114, a variable resistor 115, and two adjustable resistors 116 and 117. As illustrated, the variable resistor 115 is actuated by the motor operated rheostat 137 so that the voltage of the auxiliary generator 78 is varied to govern the speed of operation of the motors 51, 52, 53, 55, 56, 57 and 58.

The field for the motor 53 connected to the tension rolls 15 is designated by the reference character 118 and the excitation thereof is governed by an adjustable rheostat 119 and 217. The field for the buck-and-boost generator 80 is identified by the reference character 120 and the excitation thereof is governed by a variable resistance 121. The field for the motor 55 driving the grey back cans 34 is identified by the reference character 122 and the excitation thereof is governed by a variable rheostat 123. The two variable resistors 121 and 123 are diagrammatically connected together by two dash lines 32 which indicate that these two variable resistors are governed by the dancer roll rheostat 32 as shown on Figure 1 over which the back grey passes before entering the back grey cans 34. The operation of the dancer roll rheostat 32 upon the resistors 121 and 123 is the same as that described for the operation of the dancer roll rheostat 14 upon the resistors 105 and 112. That is to say, the speed of the motor 55 is not only varied by the change in its field excitation but is also varied by the voltage impressed upon its armature, as modified by the buck-and-boost generator 80. The motor 56 which drives the batcher device 40 is also varied by the change in voltage as affected by the buck-and-boost generator 80 in order that the batcher device 40 may wind up the material as fast as it is delivered to it, as governed by the dancer roll rheostat 32. The field for the motor 56 driving the batcher device 40 is identified by the reference character 124 and the excitation thereof is governed by the adjustable resistor 125. The field for the motor 57 driving the main cans 18 is identified by the reference character 127 and is governed by the adjustable rheostat 128. The field for the motor 58 that drives the folding rolls 19 is identified by the reference character 129 and the excitation thereof is governed by the adjustable resistance 130. The field for the exciter 81 is identified by the reference character 131 and the excitation thereof is governed by the adjustable resistor 132. A fixed resistor 102 is in series with the armature of the motor 51, an adjustable resistor 103 is in series with the armature of the motor 53 and a fixed resistor 104 is in series with the armature of the motor 56.

The operator threads the machine by either running it at a low speed of approximately 10 yards per minute by setting up a "run slow" condition or operating a jogging circuit. After the machine is threaded with the cloth to be printed, the machine may then be operated under a "run fast" condition. In Figure 2 of the diagrammatic drawings, the block indicated by the reference character 148 designates the jog push button, the block indicated by the reference character 149 designates the "run slow" push button, and the block indicated by the reference character 150 designates the "run fast" push button.

In explaining the operation of our electrical system, let it be assumed that the "run slow" push button 149 is operated. In order that the "run slow" push button 149 may be operative it is necessary that current from the conductor 133, as supplied from the exciter 81 first flow through a relay 145 and a rapid-stop push button indicated by the reference character 147. The rapid stop push button 147 is normally closed, so that it need not be operated to establish the run slow condition. The relay 145, however, is controlled as indicated by the lead line 146 from the contactor 86 that governs the energization of the alternating current motor 83. That is to say, the relay 145 is not energized until the contactor 86 is closed which means that the synchronous transmitter 59 and the synchronous receiver 62 are first electrically energized to keep the printing cylinder 16 in synchrony with the main cans 18 before the driving motors are set in operation. The relay 145 also insures that the run slow condition cannot be put into operation until the threading generator 77, and the buck-and-boost generators 79 and 80 are in running operation. The relay 145 having been closed and the rapid stop push button 147 being normally closed, the depression of the run slow push button 149 energizes the relays 151, 156 and 159. The energization of the relay 151 closes a contactor 152 through the dash-dot lead line 153 and opens a contactor 154 through the dash-dot lead line 155. As will be explained more in detail with the Figures 3, 4 and 5, the relay 151 is energized only so long as the run slow push button 149 is depressed by the operator's finger. Therefore, the purpose of closing the contactor 152 is to shunt out the resistor 99 to boost the voltage of the threading generator 77 which in turn boosts the voltage impressed upon the main starting motor 54 to overcome initial starting torque. The purpose of opening the contactor 154 is likewise to boost the voltage upon the auxiliary generator 78 in order to impress an increased voltage upon the sectional motors having their armature circuits energized by the auxiliary generators 78. The reason that the contactor 152 need be closed to boost the voltage of the threading generator is that the resistor 99 is in series with the field 97 and the reason that the contactor 154 need be open to boost the voltage of the auxiliary generator 78 is that the potentiometer resistor 117 is in a potentiometer resistance circuit which means that the excitation of the field 113 is increased when the contactor 154 is open. The energization of the relay 156 closes a contactor 157 through the dash-dot lead line 158 and connects the armature of the auxiliary generator 78 in circuit relation with the buck-and-boost generators 79 and 80, and the sectional motors 51, 52, 53, 55, 56, 57 and 58. The energization of the relay 159 closes a contactor 160 through the dash-dot lead line 161 which connects the armature of the main driving motor 54 in circuit relation with the threading generator 77. The relays 156 and 159 are also electrically connected to the sliding contacts of the motor operated rheostat 137. The sliding contacts of the motor operated rheostat 137 are diagrammatically illustrated, the small block 164 represents the stand-still position of the motor operated rheostat, and the two longer blocks 165 and 166 designate the first and second stage accelerating contacts of the motor operated rheostat. The sliding pointer 167 is actuated up- and-down along the contacts by the rack-and- pinion drive 138. As illustrated, the relay 156 is electrically connected to the stand-still block 164 through the lead line 168, which means that the relay 156 cannot be energized unless the motor operated rheostat is in its stand-still position, being the position where the pointer 167 coincides with the stand-still block 164. The relay 159 is connected through the lead line 169 to both the stand-still block 164 and the first stage accelerating block 165. Thus, the relay 159 is energized when the motor-operated rheostat is in its early stages of acceleration as well as in its stand-still position. Accordingly, the threading generator 77 is connected in circuit relation with the main motor 54 through the operation of the relay 159 and the closing of the contactor 160 only during slow speed operations of the printing machine. The relays 170, 173, 176 and 180 which are arranged in a vertical group are likewise energized in the run slow condition. The relays 176 and 180 are controlled through the lead line 182 through the standstill block 164 of the motor operated rheostat. The relays 176 and 180 are likewise electrically influenced through the lead line 163 by the relay 151. The relays 170 and 173 are electrically influenced through the lead line 190 by the run slow push button 149. The energization of the relay 170 closes the contactor 171 through the dash-dot lead line 172. The contactor 171 is normally open so that the resistor 96 is normally in the field of the field 95 to limit the current flowing therethrough when the motor 54 when it is standing still. As soon as the run slow push button 149 is operated, the contactor 171 is closed and full excitation is put upon the field 95 for giving increased starting torque to the main motor 54. The energization of the relay 173 closes the contactor 174 through the dash-dot lead line 175 and completes the establishment of the fields 110 and 120 for the buck-and-boost generator 79 and 80, respectively. The energization of the relay 176 opens the contactor 177 through the dash-dot lead line 178. The opening of the contactor 177 puts the resistor 119 in the field 118 and enables the operator to operate the variable resistor 119 to make the tension motor 53 operate as a motor in threading the cloth through the tension rolls 15. It is to be noted that the contactor 177 is held open through the relay 176 only so long as the pointer 167 is on the standstill block 164 of the motor operated rheostat. In other words, when the pointer 167 is moved up and coincides with the accelerating blocks 165 and 166 by the motor operated rheostat, is as it will be operated under the fast run condition for production printing, contactor 177 is closed and removes the resistor 119 from the field 118 and causes the motor 53 to act as a drag generator to produce tension upon the cloth preparatory to the cloth entering the printing cylinder 16. Since the motor 53, acts both as a motor for threading purposes and as a generator for tension purposes during printing production, it is referred to in the claims and elsewhere as a dynamo-electric machine. The armature of the motor 53 which is connected to the tension rolls 15 is also provided with an adjustable resistance 103 which may be operated either manually or by an automatic regulator to keep the current flowing through the armature of the motor 53 at a constant value to maintain a substantially constant tension on the cloth. The energization of the relay 180 closes a contactor 181 through the dash-dot lead line 182 and shorts out the variable resistance of the differential regulator and establishes a strong excitation upon the field 95 for the main motor 54 during the run slow condition.

The closing of a snap switch 183 connects the motor 55 that drives the back grey cans 34 in circuit relation with the auxiliary generator 78 so that the back grey cans 34 may be started at the same time as the other elements of the machine are started. The closing of the snap switch 183 energizes a relay 184 which closes a contactor 189 through the lead line 186. The relay 184 is electrically connected through the lead line 185 to the stand-still block 164 of the motor operated rheostat which means that the motor 55 driving the back grey cans 34 can only be brought into operation during the run slow condition for the threading of the cloth and not during the run fast condition which is for printing operation. In addition, the energization of the relay 184 closes a contactor 188 to energize the field 122 for the motor 55 and opens a contactor 187 and removes the resistor 126 from the field 122. In stopping the motor 55 the contactor 188 is opened and the contactor 187 is closed, so that the voltage set up in the field 122 may be discharged through the resistor 126.

The closing of a snap switch 192 establishes the armature circuit for bringing in the motor 56 which drives the batcher device 40, so that it may be started with the other elements of the entire machine. The closing of the switch 192 energizes a relay 193 which through the dash- dot line 195 opens the contact 196, closes the contact 197 and 198. The closing of the contact 198 connects the armature of the motor 56 in circuit relation with the auxiliary generator 78 so that the motor 56 may be started along with the rest of the sectional motors. The closing of the contactor 197 establishes the circuit for the field 124 and the opening of the contactor 196 removes the resistor 126 from the field 124. In stopping the motor 56, the contact 197 opens and the contact 196 closes which connects the field 124 in series with the resistance 126 to discharge the field 124. The relay 193 is also electrically connected through the lead line 194 to the stand-still block 164 of the motor operated rheostat which means that the motor 56 cannot be connected in circuit relation with the armature of the auxiliary generator 78 unless the equipment is under the run slow condition.

A resistor 144 is in series with the armature of the motor 56 so that as the grey back winds up on the batcher device 40 and the diameter of the batcher reel becomes larger, the speed of the motor gradually decreases.

Inasmuch as the cloth accumulates upon the scray device 12, the motor 51 which drives the first pair of pull rolls 11 is designed to be controlled either independently of the other motors or in unison with them. Thus, the depressing of a start button 199 energizes a relay 210 which through the dash-dot line 211 closes the contactor 212 to connect the armature of the motor 51 in circuit relation with the auxiliary generator 78 and the buck-and-boost generator 79. The energization of the relay 210 operates a relay 213 which through the dash-dot line 214 shortly closes the contactor 215 and shunts out the resistor 102. The relay 213 is arranged to have a delayed pickup, so that the resistor 102 is in the armature circuit of the motor 51 only momentarily during the starting of the motor, and just as soon as the relay 213 picks up, after the short time delay, the contactor 215 is closed to shunt the resistor 102 and the motor then operates at normal condition. The purpose of the resistor 102 and the time delay action of the contactor 215 is to give smoother starting to the motor 51 in unwinding the cloth from the supply reel 10.

Summarizing, under the condition of the run slow push button 149 being depressed, the main motor 54 is energized from the threading generator 77, the motor 51 which drives the first pull rolls 11 is energized and operating provided the start push button 199 is pressed, the motor 52 which operates the second set of pull rolls 13 is operating, the motor or dynamo-electric 53 which is connected to the tension rolls 15 is operating, the motor 55 which drives the back grey cans 34 may be made to operate upon the closing of the snap switch 183, the motor 56 which drives the batcher device 40 may be made to operate by closing the snap switch 192, the motor 57 which drives the main cans 18 is operating, and the motor 58 which drives the folding rolls 19 is operating.

After the machine is threaded and in condition for normal printing operation, the operator then increases the speed of the machine by depressing the run fast push button 150. The essential thing that happens when the run fast push button 150 is depressed is that the relay 231 is brought into operation through the lead line 221 and that the motor operated rheostat 137 is connected to operate, as indicated by the lead line 220 and the sliding pointer 167 begins to move up along the sliding accelerating contacts 165 and 166 and breaks the circuit with the standstill block 164. As shown by the lead line 222, the circuit for operating the relay 231 is not completed until the pointer 167 engages the accelerating block 166. Also, upon the operation of the fast run push button, the relays 176 and 180 become de-energized just as soon as the sliding pointer 167 breaks the circuit with the standstill block 164. The deenergization of the relay 180 opens the contactor 181 and inserts the variable resistance 65 in the field 95 of the main motor, so that the field excitation of the main motor may now be governed by the differential regulator 63. The de-energization of the relay 176 closes the contact 177 and shunts the resistor 119 from the field 118 and causes the motor or dynamo-electric 53 connected to the tension rolls 15 to operate as a direct generator to produce tension upon the cloth being fed to the main printing cylinder 16. Just as soon as the sliding pointer 167 engages the first accelerating block 165, a circuit is established for energizing a relay 223 through the lead line 224. Energization of the relay 223 closes the contactor 225 through the dash-dot lead line 226. The closing of the contactor 225 connects the two relays, 227 and 228 between the threading generator 77 and the main generator 76, so that the relays 227 and 228 operate upon the differential voltage between the two generators. In practice the two relays 227 and 228 are such that they open when a differential voltage of more than 5 volts exists across their coils and such that they close when the differential voltage across their coils is less than 5 volts. As illustrated, the two relays 227 and 228 are electrically connected to the relays 159 and 231 through the dash-dot lines 229 and 230. The relay 231, when energized, is arranged to close the contactor 233 through the dash-dot line 232. Thus, the relays 159 and 231 may be characterized as transfer relays for transferring the armature of the main motor 54 from the threading generator 77 to the main generator 76 for fast run condition. The action of the transfer from the threading generator 77 to the main generator 76 may be described as follows: Upon the depression of the fast run push button 150, the motor operated rheostat 137 is put in operation and the sliding pointer 167 begins to move up and make engagement with the accelerating contact blocks 165 and 166. Just as soon as the starting point 167 engages the block 165 a circuit is established for energizing the relay 223 which in turn closes the contact 225 for introducing the relays 227 and 228 between the threading generator 77 and the main generator 76. In the meantime, the pointer 167 is still moving up and when it passes from the block 165 to the block 166 the relay 159 thereby becomes de-energized which in turn opens the contactor 160 and removes the threading generator 77 from circuit relation with the main motor 54. By the time that the sliding pointer 167 reaches the gap between the blocks 165 and 166, the voltage of the threading generator 77 and the voltage of the main generator 76 are so adjusted that the difference in the voltages therebetween is less than 5 volts so that the relays 227 and 228 close to energize the relay 231, since this relay makes electrical contact only with the upper accelerating block 166 of the voltage regulator. In other words, the relay 231 will not become energized unless the differential voltage upon the relays 227 and 228 is less than 5 volts even though the relay 231 is connected in circuit relation with the upper accelerating block 166 through the sliding pointer 167. The purpose of the relays 227 and 228 is to prevent too large a current disturbance as the motor 154 is transferred from the threading generator 77 to the main generator 76. In actual practice, the transfer from the threading generator 77 to the main generator 76 may take place in the neighborhood of 35 volts which means that above 35 volts the main motor 54 is operated from the main generator which carries the voltage up to normal operation in the neighborhood of 230 to 240 volts. The dot-line 216 leading from the lead line 224 and the accelerating block 166 indicates that this circuit is disrupted after the pointer 167 passes beyond the dot-line 216 to de-energize the relay 223 and remove the relays 227 and 228 from the differential circuit between the threading generator 77 and the main generator 76, so that the relays 227 and 228 are not exposed to high differential voltages at high speeds. The speed to which the main motor attains under the fast run condition is determined by the setting of the motor operated rheostat 137 which varies the field excitation of the field 91 for the main generator 76. The speed of the remaining sectional motors which are connected to receive energization from the auxiliary generator 78 is determined by the field excitation of the field 113 for the auxiliary generator 78 through the variable movement of the resistor 115 as operated by the motor operated rheostat. It is to be observed that the motor 51 driving the first pair of pull rolls 11 can be started and stopped under the run fast condition, whereas the motors 55 and 56 driving the grey back cans 34 and the batcher device 40 cannot be started or stopped under the run fast condition, because relays 184 and 193 which control the armature circuit for the motors 55 and 56 are de-energized just as soon as the sliding pointer 167 moves from the stationary stand still block 164 upon the motor operated rheostat 137.

When the operator desires to stop the entire machine after it has been operating in the run fast position, he first depresses the run slow button 149 which connects the motor operated rheostat 137, only for decelerating purposes, in circuit relation with the run slow push button 149 through the lead line 234. Therefore, the motor operated rheostat begins operating in a reverse direction and the sliding contact 167 moves downwardly. When it passes from the block 166 to the block 165, the transition takes place for transferring the main motor 54 from the main generator 76 back to the threading generator 77. Upon the deceleration of the main motor 54, the relays 227 and 228 function to prevent too large a current disturbance upon the armature of the motor 54 during the transition period by operating the relays 231 and 159 such that a differential voltage of less than 5 volts exists between the threading generator 77 and the main generator 76 upon the transition taking place. In the run slow position the motor operated rheostat 137 continues to operate until the sliding pointer 167 reaches the stand-still block 164 which means that the speed of the machine has been reduced to approximately 10 yards per minute after which the operator stops the entire machine by depressing the push button 147 which de-energizes all of the relays. The relay 147 is normally referred to as a rapid stop push button because, regardless of the speed under which the machine is operating, in cases of emergency, the operator can depress this button and completely stop our system of control. As shown, the rapid stop button 147 through lines 235 and 234 causes the motor operated rheostat to operate in a reverse direction extremely fast and effect a very rapid stop. The method of stopping the entire equipment by depressing the rapid stop push button 147 is resorted to only in the case of emergency. The normal method of stopping the equipment is to first depress the run slow button to reduce the speed to approximately 10 yards per minute and then depress the rapid stop button 147 which does not cause a rapid deceleration of the motor operated rheostat since the motor operated rheostat has already been actuated to its stand-still position.

In our system of control, we use separate generators for the main motor 54 and the remaining motors 51, 52, 53, 55, 56, 57 and 58. In this manner the speed of the main motor 54 may be controlled by the voltage impressed thereon from the main generator, as well as by the change in the field excitation of the motor 54. Also, the load on the printing machine 16 sometimes may be light and sometimes may be heavy and for this reason by using separate generators the voltage fluctuation in the main generator 76 is separate from the voltage generated in the auxiliary generator 78, so that the motors 51, 52, 53, 55, 56, 57 and 58 are independent of any load conditions upon the printing cylinder 16. Also, the differential regulator 63 has no effect upon the voltages impressed upon the motors 51, 52, 53, 55, 56, 57 and 58. The employment of the threading generator 77 and main generator 76 to energize the main motor 54 also gives active control at threading speed as well as at high speed.

In the event that the operator prefers to thread the machine by jogging instead of running the machine under the run slow condition, he may depress the jog button 148 to energize the relays 156 and 159 for closing the contactors 157 and 160, respectively. The depression of the job button 148 also establishes circuits for energizing the relays 170 and 173 which closes the contactor 171 and 174. The relays 176 and 180 are also energized through the standstill position 164 on the motor operated rheostat which means that the contactor 177 is open and the contactor 181 is closed. The jogging button 148 is associated with a time delay interrupting circuit designated by the reference character 236, such that even though the operator should depress the jog button 148 for a long period of time the jogging is automatically interrupted at a pre-determined time interval. Therefore, regardless of whether or not the operator depresses the button 148 only momentarily, or for a long period of time, the effect of the jogging operation is to give a time limit to each jog operation.

Figure 3:
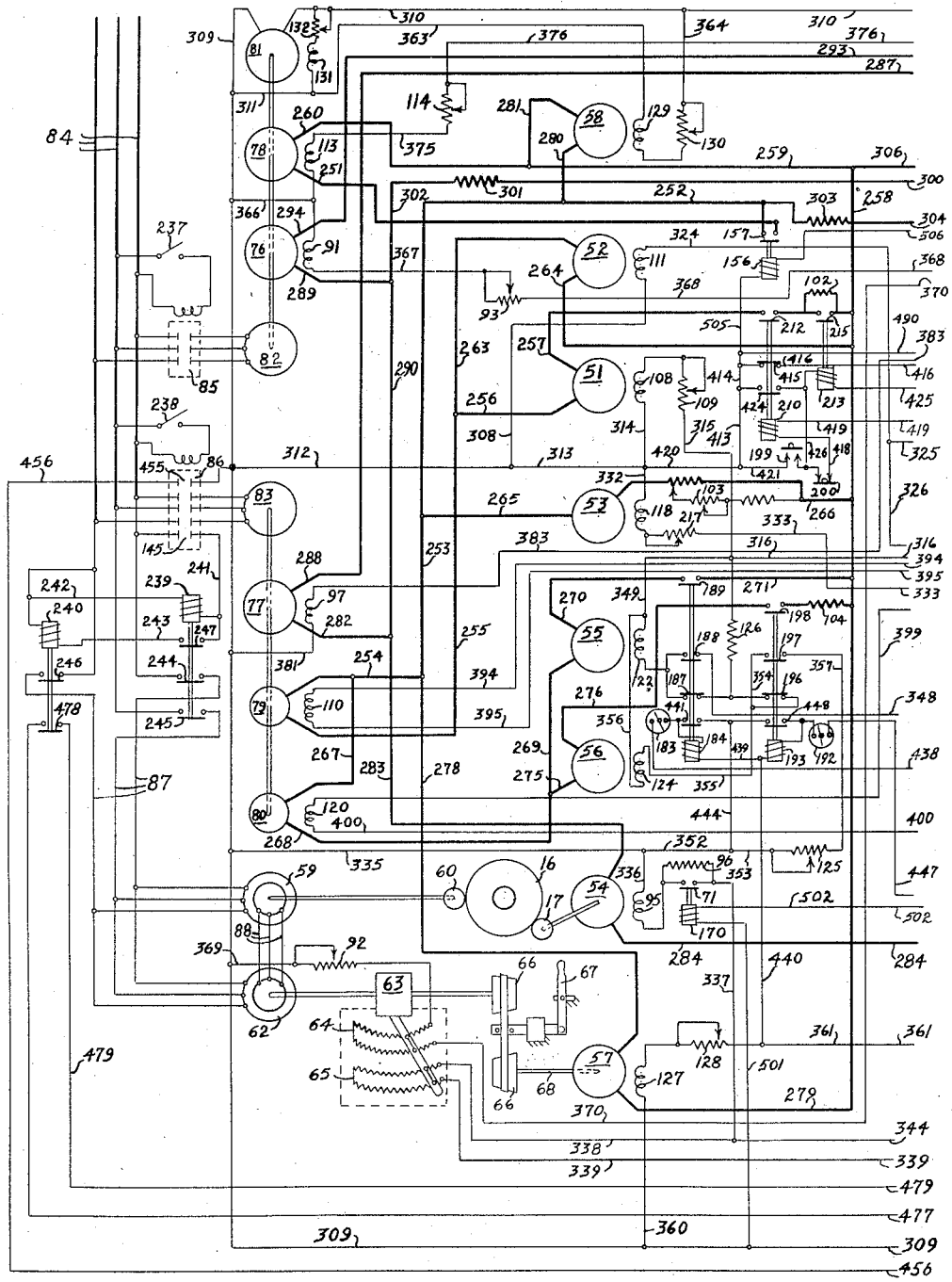
Figures 3, 4 and 5 are to be considered together as one complete electrical diagram for the entire electrical system.
Figure 4:
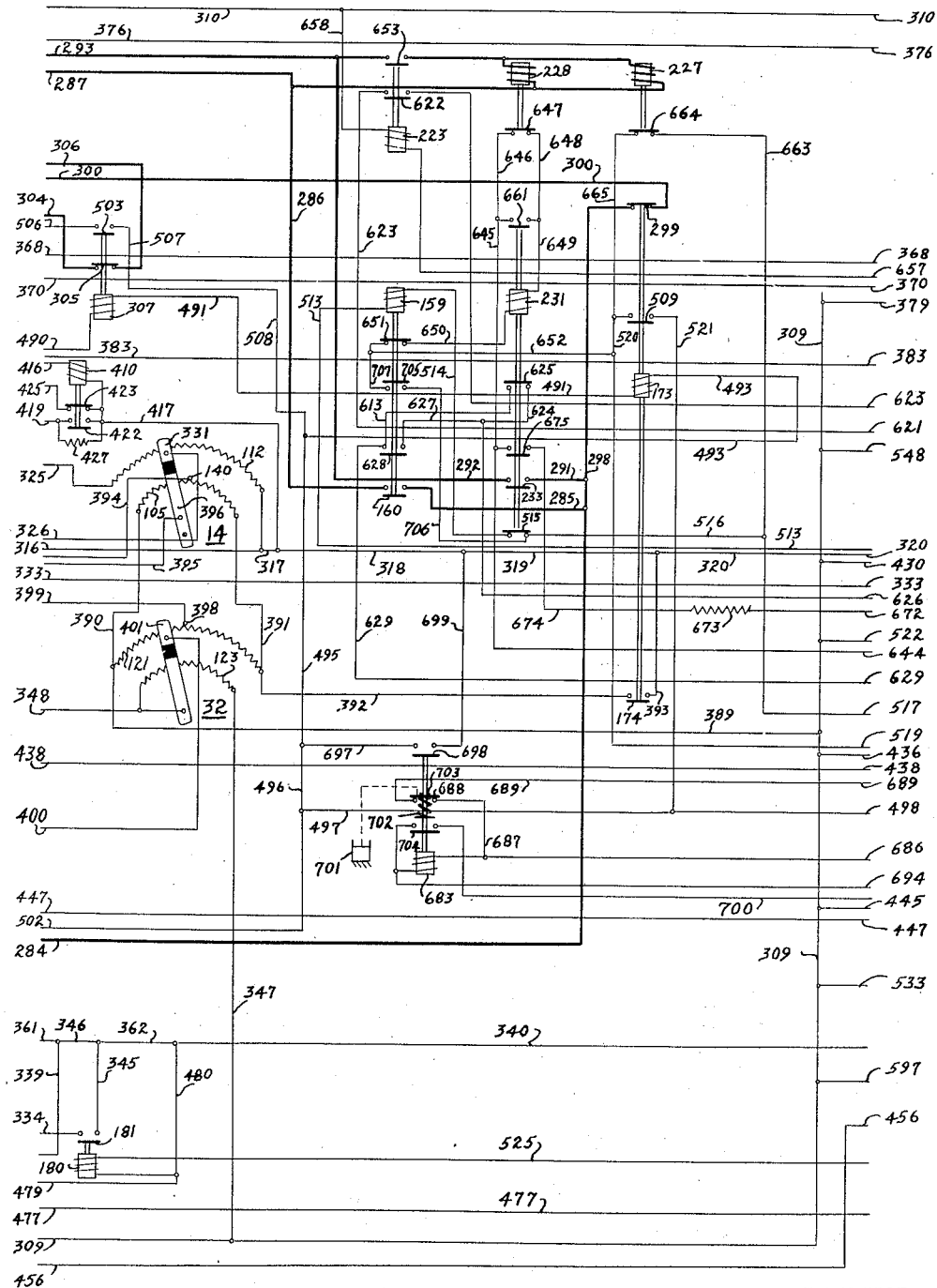

The complete circuit for our control system is shown in Figures 2, 3 and 4, in which corresponding reference characters represent the same parts as illustrated on the diagrammatic drawing in Figure 2. The alternating current motor 82 is set into operation by closing the switch 237 which actuates the contactor 85 for supplying alternating current thereto. The alternating current motor 83 is set in operation by closing the switch 238 actuating the contactor 86 which supplies alternating current thereto. The closing of the extra contactor 146, as the alternating current motor 83 is energized, establishes a circuit for energizing a relay 239 through the conductors 241 and 242. The closing of the contact 247 of the relay 239 establishes a circuit for energizing a relay 240 through the conductors 243. The closing of the contacts 244 and 245 of the relay 239 and the closing of the contact 246 of the relay 240 connects the primaries of the synchronous transmitter 59 and synchronous receiver 62 in circuit relation with the alternating current supply 84 through conductors 87. In accordance with the above electrical arrangement, the synchronous transmitter 59 and synchronous receiver 62 are electrically energized to keep the lineal speed of the printing cylinder 16 in synchrony with the linear speed of the main cans 18 just as soon as the alternating current motor 83 is energized for operation.

Figure 5:
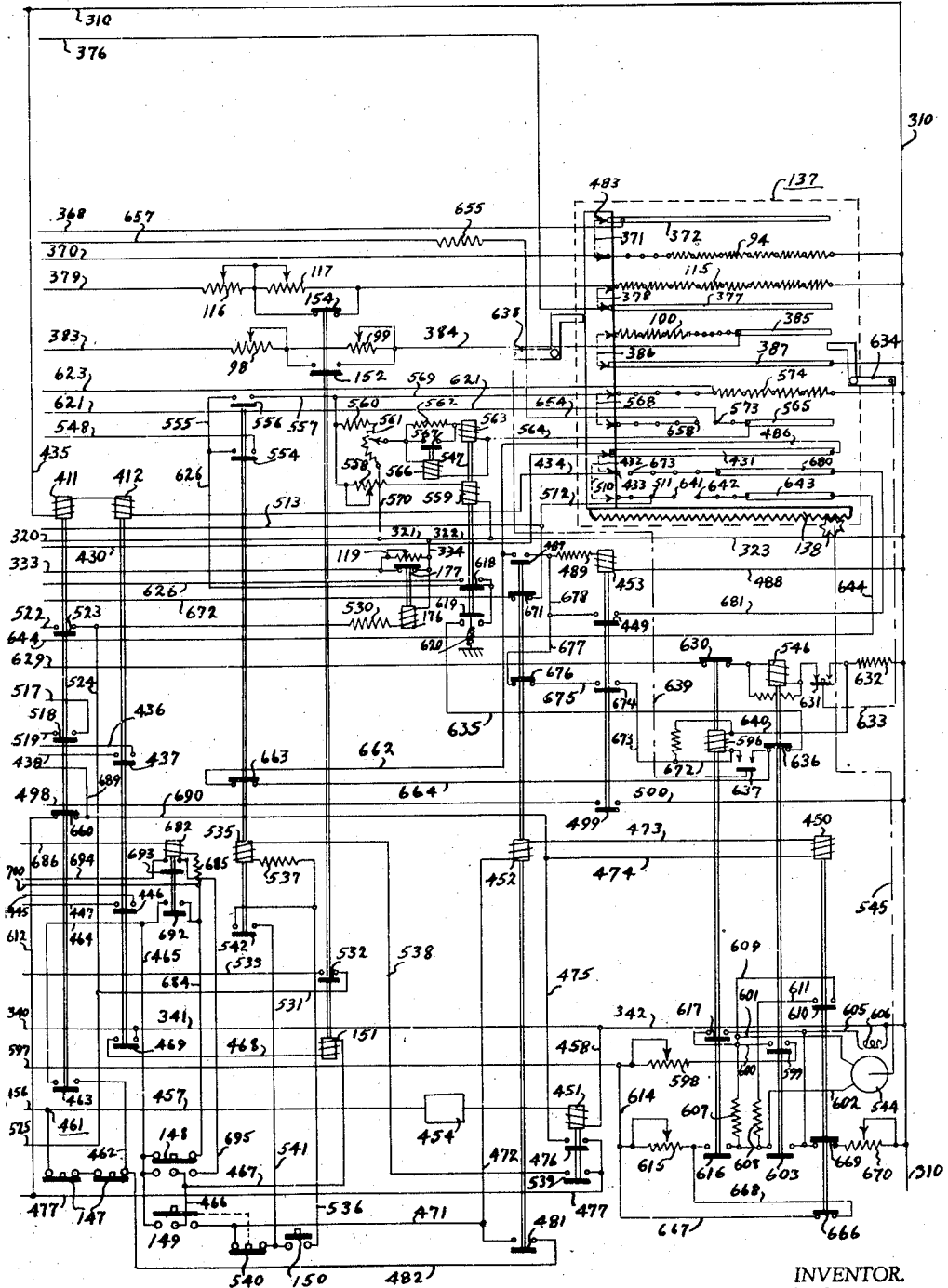

In describing the diagram in Figures 3, 4 and 5, the armature circuits for the sectionalized motors will be traced first. The circuit for energizing the armature of the motor 51 may be traced; beginning with conductor 251 of the auxiliary generator 78 current flows through the contact 157 of the relay 156, the conductors 252, 253, 254, the armature of the buck-and-boost generator 79, the conductors 255 and 256, the armature of the motor 51 and then through a conductor 257, the contact 212 of the relay 210, the contact 215 of the relay 213 and the conductors 258, 259 and 260 to the opposite side of the armature of the auxiliary generator 78. The circuit for energizing the armature of the motor 52 may be traced as follows beginning with the conductor 251 of the auxiliary generator 78 current flows through the contact 157 of the relay 156, conductors 252, 253, 254 through the armature of the buck-and-boost generator 59, after which current flows through conductors 255 and 263 to the armature of the motor 52, after which current flows through the conductors 264, 258, 259 to the conductor 260 on the opposite side of the auxiliary generator 78. The circuit for energizing the armature of the motor 53 may be traced as follows; beginning with conductor 251 of the auxiliary generator 78 current flows through the contactor 157 of the relay 156, conductors 252 and 265 to the armature of the motor 53, the system of resistors 103 and conductors 266, 258, 259 to the conductor 260 on the opposite side of the auxiliary generator 78. The circuit for energizing the armature of the motor 55 may be traced as follows; beginning with the conductor 251 of the auxiliary generator 78 current flows through the contactor 157 of the relay 156, conductors 252, 253, 254, 267 to the armature of the buck-and-boost generator 80, conductors 268 and 269 to the armature of the motor 55, conductor 270, the contactor 189 of the relay 184, and conductors 271, 258, 259 to the conductor 260 on the opposite side of the auxiliary generator 78. The circuit for energizing the armature of the motor 56 may be traced; beginning with the conductor 251 of the auxiliary generator 78 current flows through the contactor 157 of the relay 156, conductors 252, 253, 254, 267 to the armature of the buck-and-boost generator 80, conductors 268 and 275 to the armature of the motor 56, a conductor 276 to the contactor 198 of the relay 193, a resistor 104 and conductors 258, 259 to 260 on the opposite side of the auxiliary generator 78. The circuit for energizing the armature of the motor 57 may be traced; beginning with the conductor 251 of the auxiliary generator 78 current flows through the contactor 157 of the relay 156, conductors 252, 253, 278 to the armature of the motor 57, and conductors 279, 258 and 259 to the conductor 260 on the opposite side of the auxiliary generator 78. The circuit for energizing the armature of the motor 58 may be described as follows; beginning with the conductor 251 of the auxiliary generator 78 current flows through the contactor 157 and the relay 156, conductors 252 and 280 to the armature of the motor 58, and conductor 281 to the conductor 260 on the opposite side of the auxiliary generator 78.

The circuit for energizing the armature of the main motor 54 from the threading generator 77 may be traced; beginning with the conductor 282 current flows through conductor 283 to the armature of the motor 54, conductors 284 and 285 to the contactor 160 of the relay 159, conductors 286 and 287 to the conductor 288 on the opposite side of the threading generator 77. The circuit for energizing the armature of the main motor 54 when energized from the main generator 76 may be traced; beginning with the conductor 289 current flows through conductors 290 and 283 to the armature of the motor 54, conductors 284 and 291, the contactor 233 of the relay 231, conductors 292 and 293 to the conductor 294 on the opposite side of the main generator 76. Upon the de-energization of the main driving motor 54, a dynamic breaking circuit is established through the armature of the main motor 54 which may be traced as follows, beginning with the conductor 284 on one side of the armature of the main motor 54 dynamic breaking current flows through conductor 298, the conductor 299, conductor 300, a resistor 301, and conductor 302, 290, 283 to the opposite side of the armature of the main motor 54. Also, when the armatures of the motors 51, 52, 53, 55, 56, 57 and 58 are de-energized a dynamic breaking circuit is set up for these motors which extends from opposite sides of their common connection; namely, from conductor 252 which is common to one side of the motors 52, 53, 55, 56, 57 and 58 through a resistor 303, conductor 304, contactor 305 of the relay 307, and conductor 306 which is connected to the conductors 259 and 258 which are common to the other side of the motors 51, 52, 53, 55, 56, 57 and 58.

The circuit for energizing the fields for the various motors and generators will be described next. All of the fields are energized from the exciter 81. One side of the exciter has a common conductor 309 which extends vertically downwardly on Figure 3, then to the right along the bottom of Figure 3 over to the lower right-hand edge of Figure 4 and then vertically upwardly towards the top of the Figure 4. The other side of the exciter 81 is connected to a common conductor 310 which extends across the top of Figures 3, 4 and 5 and then down the right hand side of Figure 5. The circuit for energizing the field 131 of the exciter extends from the common conductor 309 through conductor 311 to the field 131 and the adjustable resistor 132 to the common conductor 310. The circuit for energizing the field 108 for the motor 51 may be traced; beginning with the common conductor 309 through conductors 312, 313, 314, the field 108, the adjustable resistor 109, conductors 315, 316, 317, 318, 319 and 320, 321, 322 and 323 to the other common conductor 310. The circuit for energizing the field 111 of the motor 52 may be traced; beginning with the common conductor 309 through conductor 312 and 308, the field 111 of the motor 52, conductors 324 and 325, the potentiometer rheostat resistor 112, and conductor 317, 318, 319, 320, 321, 322 and 323 to the common conductor 310. The pointer 331 for the potentiometer rheostat 112 is connected by a conductor 326 over to the conductor 325 which is connected to the beginning of the potentiometer resistor 112. The potentiometer rheostat 112 comprises part of the dancer roll rheostat 14 as shown on Figures 1 and 2 of the drawings. The circuit for energizing the field 118 of the motor 53 may be traced as follows; beginning with the common conductor 309 current flows through conductors 312, 313, 332, the field 118 of the motor 53, the adjustable resistor 217, conductor 333, adjustable resistor 119, conductors 334, 322 and 323 to the common conductor 310. The variable resistor 319 is shunted by the contactor 177 of the relay 176. The contactor 177 is open when the motor 53, or the dynamo-electric machine 53, is operating as a motor for threading purposes so that the operator may adjust the rheostat 119 to control the speed for threading purposes. For normal printing operation, the contactor 177 is closed and the excitation of the field 118 is governed by the setting of the resistor 217.

The circuit for energizing the field 95 of the main driving motor 54 may be traced as follows; beginning with the common conductor 309 current flows through conductors 335 and 336, the field 95, resistor 96, conductors 337 and 338, the variable resistor 65 of the differential regulator, conductors 339, 346, 362, 340, 341 and 342 to the other common conductor 310. The relay 170 is energized in the slow run position so that the contactor 71 shunts the resistor 96 in the slow run or jogging position to put full field upon the motor 54. The resistor 65 of the differential regulator is likewise shunted by the contactor 181 of the relay 180 during the run slow condition or the jogging condition through conductors 338 and 344, the contactor 181, conductors 345, 346 and conductors 339. The circuit for energizing the field 122 of the motor 55 may be traced from the common conductor 309, as appearing on the bottom of Figure 4 through conductor 347 the potentiometer resistor 123, conductor 348, the contactor 188 of the relay 184, the field 122, conductors 349, 316, 317, 318, 319, 320, 321, 322 and 323 to the opposite common conductor 310. The potentiometer resistor 123 comprises part of the dancer roll rheostat 32 as shown in Figures 1 and 2 of the drawings. The circuit for energizing the field 124 of the motor 56 may be traced as follows: beginning with the common conductor 309 current flows through conductors 335, 352, 353, the adjustable resistor 125, conductor 357, contactor 197, conductors 354 and 355, the field 124, and conductors 356, 349, 316, 317, 318, 319, 320, 321, 322 and 323 to the common conductor 310. When the relays 184 and 193 are de-energized and the contactors 187 and 196 are closed the fields 122 for the motor 55 and the field 124 for the motor 56 discharges through a resistor 126 connected to conductors 316, 317, 318, 319, 320, 321, 323 to the common conductor 310.

The circuit for energizing the field 127 of the motor 57 may be traced from the common conductor 309, as found on the bottom of the Figure 3, through conductor 360, the field 127, the adjustable resistor 128, conductor 361, 346, 362, 340, 341 and 342 to the common conductor 310. The circuit for energizing the field 129 of the motor 58 may be traced; beginning with the common conductor 309 current flows through conductors 311, 363, the field 129, the adjustable resistor 130, and conductor 364 to the common conductor 310.

The circuit for energizing the field 91 of the main generator 76 is a parallel circuit in which one branch may be traced from the common conductor 309 through conductor 366, the field 91 of the main generator 76, conductor 367, the adjustable resistor 93, conductors 368 to the slide bar 372 of the motor operated rheostat 137, then through the bridge conductor 371 and the resistor 94 to the common conductor 310. The other parallel branch, which is electrically connected with the field 91 of the main generator 76, may be traced from the common conductor 309 through conductors 369, the adjustable resistor 92, the variable rheostat 64 of the differential regulator 63, conductor 370 to the resistance 94 of the motor operated rheostat 137 and to the common conductor 310. Therefore, the field 91 of the main generator 76 is controlled by both the resistor 94 of the motor operated rheostat and the resistor 64 of the voltage regulator 63.

The circuit for energizing the field 113 of the auxiliary generator 78 likewise comprises two parallel circuits which may be traced as follows: the first parallel circuit may be traced beginning with the common conductor 309, through conductor 366, the field 113 of the auxiliary generator 78, conductor 375, adjustable resistor 114, conductor 376 to the slide bar 377 of the motor operated rheostat 137, the bridging conductor 378 and the resistor 115 of the motor operated rheostat to the common conductor 310. The other parallel circuit of the field 113 may be traced beginning with the common conductor 309, as found on the vertical right hand edge of the Figure 4, current flows through conductor 379 to the adjustable resistor 116, the adjustable resistor 117, the resistor 115 of the motor operated rheostat and then to the common conductor 310. The circuit for energizing the field 97 of the threading generator 77 may be traced as follows: beginning with the common conductor 309 current flows through conductor 381, the field 97, conductor, 383, the adjustable resistor 98, the adjustable resistor 99, conductor 384 to the slide bar 385 of the motor operated rheostat, the resistor 100, the bridging conductor 386, and the slide bar 387 to the common conductor 310. The circuit for energizing the field 110 of the buck-and-boost generator 79, which involves a mid-point potentiometer resistance circuit to give a negative and positive excitation to the field 110, may be traced as follows: beginning with the common conductor 309, as found upon the vertical right hand side of Figure 4, current flows through conductors 389 and 390, the potentiometer resistance 105, conductors 391, 392, the contactor 174 of the relay 173, and conductors 393, 320, 321, 322, and 323 to the common conductor 310. The field circuit which shunts the resistance circuit may be traced beginning with the mid-point 140 upon the potentiometer resistor 105 through conductor 394 to the field 110 then through conductor 395 back to the arm 396 of the potentiometer resistor. As shown on Figure 2, the resistor 105, and the arm 396 of the potentiometer resistor comprise part of the dancer roll rheostat 14. The circuit for energizing the field 120 of the buck-and-boost generator 80 also involves a potentiometer resistance circuit shunting the field 120 of the buck-and-boost generator to give both a positive and a negative excitation for giving buck-and-boost voltages. The circuit may be described as follows; beginning with the common conductor 309 on the vertical line on the right hand edge of Figure 3, current flows through conductor 389, the resistance 121, conductor 392, the contact 174 of the relay 173, and conductors 393, 320, 321, 322, and 323 to the common conductor 310. The shunting field circuit may be traced from the mid-point 398 upon the resistance 121 through conductor 399, the field 120, and conductor 400 back to the arm 401 of the potentiometer resistor. The resistor 121 and the arm 401 comprise part of the dancer roll rheostat 32 as shown as Figure 2 of the drawings.

As previously pointed out, the motor 51 which drives the first pair of pull rolls 11 is arranged to be started and stopped independently of the control of the other motors. The relays which govern the starting and stopping of the motor 51 comprise relays 210, 213 and 410. Of these relays the relay 410 is energized immediately with the starting of the exciter 81 and the circuit for energizing the relay 410 may be described as follows; beginning with the common conductor 309 current flows through conductor 312, 313, 420, 414, the contactor 415, conductor 416, the coil of the relay 410, conductors 417, 318, 319, 320, 321, 322 and 323 to the common conductor 310. The starting and stopping of the motor 51 are governed by the push buttons 199 and 200. The purpose of the three relays 210, 213, and 410 is to momentarily close the contactor 215 to insert the resistance 102 in the armature circuit of the motor 51 to prevent a rapid jerk upon starting. To this end, the relay 410 is a slow acting or time closing relay. The depression of the start button 199 sets up the circuit from the common conductor 309 through conductors 312, 313, 420 and 421, the start push button 199, the stop push button 200, conductor 418, the coil of the relay 210, conductor 419, contactor 422 of the relay 410, conductor 417, 318, 319, 320, 321, 322, 323, to the common conductor 310. The energization of the relay 210 opens the contactor 415 and de-energizes the coil of the relay 410. The de-energization of the coil 410 causes the relay 410 to slowly close as this relay is a time closing relay. Upon the closing of the contactor 423 of the relay 410 a circuit is established for energizing the coil of the relay 213 through the contactor 424 of the relay 210 and conductor 425. The energization of the relay 213 causes the contactor 215 to remove the resistor 102 from the armature circuit. The relay 210 has a self-holding circuit which, when the start push button 199 is depressed and the relay 210 is energized, extends from conductor 421 on one side of the stop push button 199 through conductor 413, the closing of the contact 424, and conductor 426 to the other side of the stop push button 199. In this manner, the motor 51 continues to be energized for operating the first pair of pull rolls 11 so long as the relay 210 is self-energized through its own contact 424. The motor 51 may be stopped by depressing the stop button 200 which de-engergizes the relay 210. Inasmuch as the relay 210 is continuously energized through its own holding circuit, a resistor 427 is shunted around the contactor 422 of the relay 410 in order to insert resistance in the circuit of the coil of the relay 210 upon the de-energization of the relay 410.

The motors 55 and 56 can only be started when the movable part 483 actuated by the rack and pinion drive of the motor operated rheostat 137 is in its standstill position on the left-hand side of the dotted box outline in Figure 5 of the drawings. In the standstill position, the relays 411 and 412 are energized, the relay 412 establishing circuits preparatory to starting the motors 55 and 56 and both relays establishing circuits for starting the equipment under jogging, run slow and run fast conditions. The circuit for energizing the relays 411 and 412 may be traced as follows: beginning with the common conductor 309 on Figure 4 of the drawings upon the vertical line, current flows through conductor 430 to the slide bar 431 of the motor operated rheostat. From the slide bar 431 current passes through the bridging conductor 432 to the standstill point contact 433 from which current flows through conductor 434, the winding of the relays 412 and 411 and the conductor 435 to the common conductor 310. Upon the movable part 483 of the motor operated rheostat leaving the standstill conductor point 433 the circuit is broken for energizing the relays 411 and 412 and thus the motors 55 and 56 cannot be started except in the standstill position; being the condition for run slow or jogging. The starting circuit for the motor 55 is completed by the operation of the relay 193. The relay 184 may be energized by closing the snap switch 183 which establishes a circuit as follows; beginning with the common conductor 309 upon the right hand vertical edge of the Figure 4, current flows through conductor 436, the contactor 437 of the relay 412, conductor 438, the snap switch 183, the winding of the relay 184, conductors 439, 440, 361, 346, 362, 340, 341, and 342 to the common conductor 310. When the relay 184 is energized it continues to be energized by its own holding circuit which means that the relay 412 has no further control over the relay 184 and the motor 55 when once started. That is to say, when once the motor 55 is started it can continue to operate even though the movable part 483 of the motor operated rheostat in Figure 5 moves to the right and breaks the circuit at the standstill contact point 433. The self holding circuit for the relay 184 may be traced as follows; beginning with the common conductor 309 upon the left hand vertical line in Figure 3 current flows through conductor 335, 352, 444, the contactor 441 of the relay 184, the winding of the relay 184 and conductors 439, 440, 361, 346, 362, 340, 341 and 342 to the common conductor 310. Upon the closing of the snap switch 192 a circuit is established for energizing the relay 193 which may be traced as follows; beginning with the common conductor 309 on Figure 4, the right hand vertical line, current flows through conductor 445, the contactor 446 of the relay 412, conductor 447 to the snap switch 192, the coil of the relay 193, the conductors 440, 361, 346, 362, 440, 441, and 442 to the common conductor 310. When the relay 193 is energized, a self holding circuit is established through the contactor 448, which circuit may be described as follows; beginning with the common conductor 309 upon Figure 3 current flows through the conductors 335, 352, 444, the contactor 448, the coil of the relay 193, conductors 440, 361, 346, 362, 340, 341 and 342 to the common conductor 310. Therefore, the motor 56 can be started only when the relay 412 is energized, being governed by the standstill position of the motor operated rheostat 137, but just as soon as the motor 56 is once started by the closing of the relay 193 it may continue to operate even though the relay 412 be de-energized.

The generators and the sectionalized motors are set in the run slow operation by depressing the run slow push button 149 which is located on Figure 5 of the drawings and comprises an auxiliary contactor 540. The conditioning of the generators and motors for the run slow speed for threading and matching purposes, is dependent upon the energization of an overload relay 451 which is governed by overload devices indicated by the block 454 and the contact 455 of the starter for the alternating current motor 83 that drives the threading generator and the two buck-and-boost generators 79 and 80. The circuit for energizing the overload relay 451 may be traced as follows; beginning with the common conductor 309 on Figure 3 current flows through contactor 455, conductor 456 and 457, the overload devices 454, the coil of the relay 451, and the conductors 458 and 342 to the common conductor 310. With the overload relay 451 energized, the depression of the run slow push button 149 establishes a circuit for energizing the following relays; namely, 151, 173, 156, 159, 170, 180, and 176. These relays are the relays shown in the diagram of Figure 2 and are adapted to control the armatures and fields of the motors and generators. The depression of the run slow push button 149 also energizes the relays 307, 450, 452 and 453. These latter four relays are not shown on the diagram in Figure 2 for the reason that they may be designated as advance set up relays and do not directly control or govern the armatures and fields of the motors and generators. The circuit for energizing the relay 151 may be described as follows; beginning with the starting point 461 on Figure 5, which is a point on the energized conductor 456 and governed by the contactor 455 on the starter for the alternating current motor 83, current flows through the rapid stop push buttons 147, conductor 462, the contractor 463 of the relay 411, which is energized because the motor operated rheostat 137 is in the standstill position, conductors 464 and 465 to the run slow push button 149, conductors 466 and 467, the winding of the relay 151, the conductor 468, the contactor 469 of the relay 412, which is energized because the motor operated rheostat is in its standstill position, and conductor 341 and 342 to the common conductor 310. The energization of the relay 151 closes the contactor 152 for shunting the resistor 99 and opens the contact 154 for including the resistor 117 in the circuit, which as explained hereinbefore is arranged to boost the voltage of the threading generator 77 and the auxiliary generator 78 during the initial starting of the equipment so long as the run slow push button 149 is depressed. That is to say, the momentary boost in voltage upon the threading generator 77 and the auxiliary generator 78 is only effective so long as the operator is depressing the run slow push button 149.

The circuit for energizing the relays 450 and 452 upon depressing the run slow push button 149 may be traced as follows; beginning with the energized depressed run slow push button 149 current flows through conductors 471 and 472, the coil of the relay 452, conductor 473, the coil of the relay 450, the conductors 474 and 475, the contactor 476 of the relay 451, and conductor 477 over to the contactor 478 on the relay 240 on Figure 3, conductor 479, 480, 340, 341 and 342 to the common conductor 310. The energization of the relay 452 establishes a holding circuit through the closing of the contactor 481 to bridge the run slow push button 149, so that the operator need no longer hold the run slow push button depressed to keep the equipment in operation. The holding circuit extends from the rapid stop push button 147 through conductor 482, contactor 481 and conductor 471. The reason that two rapid stop push buttons are shown on the drawing is that the equipment is rather extensive and covers a large area and for this reason several rapid stop push buttons are set about upon the machine in convenient locations for giving quick access to the operator in the event that an emergency arises to stop the equipment quickly. Upon the energization of the relay 452, a circuit is established for energizing the relay 453, which circuit may be traced beginning with the common conductor 309 of Figure 4 current flows through conductor 430, the slide bar 431 of the motor operated rheostat, conductor 486, contactor 487 of the relay 452, a fixed resistor 489, the winding of the relay 453 and conductor 488 to the common conductor 310. The energization of the relay 453 sets up a circuit for energizing the relays 307, 173 and 180. The circuit for energizing these relays may be traced from the common conductor of Figure 3 through conductors 312, 313, 420, 413, 414, 490, the winding of the relay 307, conductor 491, the winding of the relay 173, conductors 493, 495, 496, 497, 498, contactor 499 of the relay 453 and conductor 500 to the common conductor 310. The circuit for energizing the relay 170 may be traced from the common conductor 309 along the bottom of Figure 3 to conductor 501, the winding of relay 170, conductors 502, 497, and 498, contactor 499 and conductor 500 to the common conductor 310. The energization of the relay 307 through the opening of the contactor 305 removes the dynamic breaking circuit upon the motors 51, 52, 53, 55, 56, 57, and 58, and through the closing of the contactor 503 establishes a circuit for energizing the relays 156, which when the contactor 157 thereof is closed establishes a circuit for connecting the auxiliary generator 78 in circuit relation with the electric motors 51, 52, 53, 55, 56, 57, and 58. The circuit for energizing the relay 156 may be traced from the common conductor 309 on Figure 3 through conductors 312, 313, 420, 413, 414 and 505, the coil of the relay 156, conductor 506, the contactor 503 of the relay 307, conductors 507, 508, 495, 496, 497, and 498, contactor 499 of the relay 453 and conductor 500 to the common conductor 310. The energization of the relay 173 by the opening of the contact 299 removes the dynamic breaking circuit upon the motor 54 and by the closing of the contactor 509 establishes a circuit for energizing the relay 159 which, when the contactor 160 thereof is closed, connects the armature of the main driving motor 54 in circuit relation with the threading generator 77. The circuit for energizing the relay 159 may be traced from the common conductor 309 upon Figure 4 from the vertical line of Figure 4 through conductor 430, the slide bar 431 of the motor operated rheostat, the bridging conductors 432 and 510 to the contact point 511 upon the motor operated rheostat, conductor 512 and 513, the winding of the relay 159, conductor 514, contactor 515 of the relay 231, which is de-energized until the fast run push button 150 is depressed, conductors 516 and 517, contactor 518 of the energized relay 411, conductors 519 and 520, contactor 509 of the relay 173, conductors 521 and 498, contactor 499 and conductor 500 to the common conductor 310. When the movable part 483 of the motor operated rheostat 137 is on the standstill position, a circuit is established through the contact 523 of the relay 411 for energizing the relays 480 and 176. The energization of the relay 480 which, when the contactor 481 thereof is closed, removes the differential regulator resistor 65 from the field circuit 95 of the main motor 54. The circuit for energizing the relay 480 may be traced as follows; beginning with the conductor 309 on Figure 4 from the vertical column thereof, current flows through conductors 522, contactor 523 of the relay 411, conductors 524 and 525, the winding of the relay 180, and conductors 480, 340, 341, and 342 to the common conductor 310. The circuit for energizing the relay 176 which, when the contactor 177 thereof is open, inserts the variable resistance 119, in the field circuit 118 of the dynamo electric machine 53, causing the machine to operate as a motor and enabling the operator to operate the speed of the motor by regulating the adjustable resistor 119, may be traced as follows; beginning with the common conductor 309 on Figure 4 of the vertical column thereof, current flows through the conductor 522, the contactor 523, a resistance 530, the winding of the relay 176 and conductors 334, 322 and 323 to the common conductor 310. The contactor 532 on the relay 151 is arranged to be in parallel with the contact 522 of the relay 411 which establishes a circuit for energizing the relays 480 and 176. The parallel circuit through the contact 532 may be traced from the common conductor 309 upon Figure 4 to conductor 533, contactor 532, conductor 531 to the conductor 524 which is connected to one side of the contactor 523 of the relay 411. Thus, the relay 480 and 176 may be energized either through the relays 411 and 151, the relay 411 being energized when the motor operated rheostat is in its standstill position and the relay 151 being energized so long as the run slow push button 149 is depressed.

Summarizing, when the runslow push button 149 is depressed and with the overload 451 energized and the contactors for starting the alternating current motors 82 and 83 are closed, the motors and generators are in condition for running slow for threading or matching up purposes. Under this condition the relays 151, 450, 452, 453, 307, 173, 156, 159, 170, 176 and 180 are energized. After the equipment is running in the run slow condition it may be speeded up for normal operation by depressing the run fast push button 150.

As explained with reference to Figure 2, the depressing of the run fast push button 150 establishes a circuit for setting the motor operated rheostat 137 in operation. As the movable part 483 in Figure 5 is actuated to the right by the rack and pinion drive 138, as driven by the pilot motor 544, circuits are established for energizing the relay 231 which connects the main motor 54 in circuit relation with the main generator 76, and the relay 223 which connects the two relays 227 and 228 between the threading generators 77 and the main generator 76 in order to govern the transition with a minimum amount of current disturbance upon the main driving motor 54. In the run fast position, the relays which were established under the run slow condition are maintained except the relays 151, 176 and 180, and the relays 411 and 412 which become de-energized just as soon as the movable part 483 leaves the contact point 433 of the standstill position, in which event the contactor 660 of the relay 411 establishes a circuit in parallel with the contactor 476 of the relay 451. The circuit extends from the left terminal of the contactor 476 through conductors 475 and 659, the contactor 660 of the relay 411, conductors 612 and 477 to the right terminal of the contactor 476. The opening of the contactor 518 of the de-energized relay 411 would disrupt the circuit for energizing the relay 159, except for the fact that the contactor 705 of the relay 159 shunts the contactor 518. The shunting circuit extends from the right terminal of the contactor 518 through conductor 517, 516 and 706, contactor 705, conductors 707, 652, 519 to the other terminal of the contactor 518 of the relay 411. The pilot motor 544 which drives the rack and pinion drive for moving the movable parts 483 of the motor operated rheostat is governed by the relays 546 and 596. Upon the depressing of the run fast push button 150, the relay 546 when energized causes the pilot motor 544 to operate in such direction as to cause the rack and pinion drive 138 to move the movable part 483 to the right and the relay 596 when energized is arranged to cause the pilot motor to operate in the reverse direction to move the movable part 483 to the left. Assuming that the relay 546 is energized, the current for operating the armature of the pilot motor 544 may be traced as follows; beginning with conductor 597 upon the vertical common conductor 309 on Figure 4, current flows through conductor 597, the adjustable resistor 598, the contactor 599 of the relay 546, conductors 600 and 601, the armature of the pilot motor 554, conductor 602, contactor 603 of the relay 546, conductors 604 and 605, the field 606 of the pilot motor 544 to the common conductor 310. Paralleling the terminals of the armature of the motor 544, are two resistors 607 and 608 which function to shunt current around the armature 544. As illustrated, the resistor 607 is permanently connected across the terminals of the armature 544 whereas the resistor 608 is connected across the terminals of the armature 544 through conductor 609, the contactor 610 of the relay 450 which is energized under both the run slow condition and the run fast condition, and conductor 611. The resistor 607 and 608 tend to limit the speed of the pilot motor 544 when driving the movable part 483 of the motor operated rheostat to the right to gradually increase the speed of the sectional motors. The pilot motor 544 is arranged to be operated in a reverse direction to drive the movable part 483 to the left to slow down the speed of the motors when the relay 596 is energized and the relay 546 is de-energized. The circuit for operating the motor 544 in the reverse direction may be traced as follows; beginning with the vertical common conductors 309 of Figure 4, current flows through conductor 597 and 614, the adjustable resistor 615, the contactor 616 of the relay 596, a conductor 602, the armature of the pilot motor 544, conductor 601, the contactor 617 of the relay 596, conductor 605, the field 606 to the common conductor 310. Accordingly, when the relay 546 is energized and the relay 596 is de-energized the pilot motor 544 operates in one direction to drive the movable part 483 to the right to increase the speed of the equipment and when the relay 596 is energized and the relay 546 is de-energized the pilot motor 544 operates in a reverse direction to drive the movable part to the left to decrease the speed of operation. The selective energizing of the relay 546 and 596 are governed by the relay 535, the polarized relay 547 having two windings 559 and 563. The relay 535 is energized upon the depressing of the run fast push button 150 and the energization of the relay 535 governs the excitation of the polarized windings 559 and 563 of the polarized relay 547. The balancing of the energization of the polarized windings 559 and 563 directly govern the selective energization of the relay 546 and 596 for controlling the direction of the running of the pilot motor 544.

The circuit for energizing the relay 535 upon the closing of the run fast push button 150 may be traced as follows; beginning with the point 461 upon the energized conductor 456, current flows through the stop push buttons 147, conductor 482, the contactor 481 of the energized relay 452, conductor 471, the auxiliary contactor 540 upon the run slow push button 149, the run fast push button 150, conductor 536, a resistor 537, the winding of the relay 535, conductor 538, contactor 539 of the relay 541 and conductor 477 to the contactor 478 of the relay 240 on Figure 3 and then through conductors 479, 480, 340, 341 and 342 to the common conductor 310. The energization of the relay 535 closes a contactor 542 which establishes a holding circuit for the relay 535 around the run fast push button 150, so that the run fast push button does not have to be depressed continuously after the relay 535 picks up. The holding circuit extends through conductor 541, contactor 542 and conductor 536. The closing of the contactors 554 and 556 establish a series of circuits for energizing the polarized winding 559 and 563 of the polarized relay 547 to govern the selective energization of the relays 546 and 549 that determine the direction of the rotation of the pilot motor 544. The circuit for energizing the polarized winding 559 may be traced as follows; beginning with the vertical common conductor 309 on Figure 4 current flows through conductor 548, the contactor 554 of the relay 535, conductor 555, contactor 556 of the relay 535, conductor 557, the adjustable resistor 558, the winding 559 of the polarized relay 547, and the conductor 323 to the common conductor 310. The adjustable resistor 558 is so adjusted that the energization of the polarized winding 559 in combination with the spring 620 balances the contactors 618 and 619 between their respective contact terminals. Under this balanced condition of the polarized relay 547 the relays 546 and 596 are both de-energized which means that the pilot motor 540 is stopped. The circuit for energizing the polarized winding 563 may be traced as follows; beginning with the vertical common conductors 309 on Figure 4 current flows through a conductor 548, contactor 554 of the relay 535, conductor 555, contactor 556 of the relay 535, conductor 557, a fixed resistor 560, a manually pre-set potentiometer resistor 566, conductors 570, 321, 322 and 323 to the common conductor 310. The circuit just traced, however, does not directly energize the polarized winding 563 but does establish for energizing, a circuit at the potentiometer resistor 561 which in combination with the resistor 547 upon the motor operated rheostat establishes a balanced circuit which governs the winding 563 of the polarized relay 547. That is to say, when the resistance of the potentiometer resistor 561, as determined by the pre-setting of the pointer and the resistance 574, as determined by the position of the movable parts 483 of the motorized rheostat are balanced, then no current flows through the polarized winding 563 of the polarized relay 547. With this arrangement, the polarized relay 563 is in the balanced circuit of the bridge comprising the adjustable pre-set resistor 561 and the resistor 547 of the motor operated rheostat. Up until the movable part 483 moves to the left of the point 573 upon the motorized rheostat, the balanced circuit including the polarized winding 563 may be traced as follows; beginning with the pre-set resistor 561 current flows through a fixed resistor 562, the winding 563 of the polarized relay 547, conductor 564, the sliding bar 565 of the motor operated rheostat, a contact point 573, conductor 621, contactor 622 of the relay 223, and conductor 623 and the resistor 574 of the motor operated rheostat to the common conductor 310. Inasmuch as the bridge circuit is unbalanced when the movable part 483 of the motor operated rheostat is in its standstill position and remains unbalanced until the resistance 547, as shorted out by the movable part 483, equals to the resistance of the pre-set rheostat 561, the polarized winding 563 is energized in such direction as to close the contact 618 of the polarized relay 547 for establishing a circuit for energizing the relay 546 to establish a motor circuit for energizing the pilot motor 544 to operate the movable part 483 of the motor operated rheostat to the right. The circuit for energizing the relay 543 may be traced as follows; beginning with the vertical common conductor 309 on Figure 4 current flows through conductor 548, contactor 554 of the relay 535, conductor 626, contactor 618 of the polarized relay 547, conductor 626 to conductor 627 and 624 where the circuit divides, one circuit going through contactor 628 of the relay 159 to conductor 629 and the other circuit going through the contactor 625 of the relay 231 and conductor 613 to conductor 629, contactor 630 of the relay 596, the winding of the relay 546, the fast limit switch 631, and resistor 632 to the common conductor 310. The limit switch 631 is actuated by a dog 634 through the dash-dot line 633, so that should the movable part 483 reach the right hand edge of the motor operated rheostat, the fast limit switch 631 is open to arrest the motor 544.

As the pilot motor 544 is energized, it actuates the movable part 483 to the right and when the movable part reaches a position upon the resistor 547 such that the shunted out portion of the resistor 547 equals the pre-setting of the resistor 561 a balanced circuit results, with no current flows through the balanced circuit for energizing the relay 563, in which event the relay 546 becomes de-energized and the movement of the motor 544 is arrested. Therefore, the movement of the movable part 483 of the motor operated rheostat to the right is determined by the pre-setting of the resistor 561. The purpose of the relay 566 which is also in the balanced circuit parallel with the polarized winding 563 is to open the contactor 567 and insert the resistance 562 in series with the polarized winding 563 to make the energizing action of the polarized winding 563 positive. In the event that the operator desires to lower the speed of the equipment, he may do so by moving the pre-set resistor 561 to include less resistance for the bridge circuit, in which event an unbalanced current will flow through the polarized winding 563 in the reverse direction to close the contactor 619 which establishes a circuit for energizing the relay 596 to reverse the direction of the operation of the pilot motor 544 to operate the movable part 483 to the left. The circuit for energizing the relay 596 through the polarized relay 547 may be traced as follows; beginning with the vertical common conductor 309 on Figure 4 current flows through conductor 548, contactor 554, conductor 626, contactor 619 of the polarized relay 547, conductor 635, contactor 636 of the relay 546 which is de-energized, a slow limit switch 637 which is closed, the winding of the relay 596, conductor 640, and resistor 632 to the common conductor 310. The limit switch 637 is designated as a slow limit switch and is actuated by a dog 638 through a dash-dot line 639. That is to say, when the movable part 483 of the motor operated rheostat 137 is moved to the left to its standstill position, the dog 638 opens the limit switch 637, but that just as soon as the movable part 438 leaves the standstill position the dog 638 closes the limit switch 637. Just as soon as the relay 596 is energized, the pilot motor 544 begins to operate to actuate the movable part 483 of the motor operated rheostat 137 to the left until a balanced position is reached in the bridge circuit including the resistors 561 and 574.

As the movable part 483 of the motor operated rheostat 137 moves to the right and engages the second contact point 673 a circuit is established for bridging the gap between the first and second contact points for continuously energizing the relay 453 through a contactor 449 thereof. The circuit extends from the slide bar 680, conductor 681, contactor 449, conductor 678, resistor 489, the winding of the relay 453 and conductor 488 to the common conductor 310.

As the movable part 483 of the motor operated rheostat 137 moves further to the right upon the depressing of the run fast push button 150, a transition point is reached between the contact points 641 and 642 for transferring the main motor 54 from the threading generator 77 to the main generator 76. Up until the contact point 461 is not reached by the movable part 483, the relay 159 is energized which connects the starting generator 77 in circuit relation with the main driving motor 54. The circuit for energizing the relay 159 may be traced as follows; beginning with the vertical common line 309 on Figure 4 current flows through conductor 430, the slide bar 431 of the motor operated rheostat, the bridging conductors 432 and 510 to the contact point 511, conductors 512 and 513, the winding of the relay 159, conductor 514, contactor 515 of the relay 231, conductors 516 and 517, contactor 518 of the relay 411, conductors 519 and 520, contactor 509 of the relay 173, conductors 521 and 498, contactor 499 of the relay 453 and conductor 500 to the common conductor 310. As the movable part 483 passes over the gap to the contact 643, the circuit is interrupted for energizing the relay 159 and thus the main motor 54 is disconnected from the threading generator 77. As soon as the movable part 483 makes contact with the contact point 642 a circuit is established for energizing the relay 231 which connects the main motor 54 in circuit relation with the main generator 76. The circuit for energizing the relay 231 may be traced as follows; beginning with the vertical common conductor on Figure 4 current flows through the conductor 430, the slide bar 431 of the motor operated rheostat 137, the bridging conductors 432 and 510, to the contact point 642, the slide bar 643, conductors 644, 645 and 646, the contactor 647 of the relay 228, conductors 648 and 649, the winding of the relay 231, conductor 650, contactor 651, conductor 652 and 520, contactor 509 of the relay 173, contactor 521 and 498, contactor 499 and conductor 500 to the common conductor 310. As previously traced, the closing of the contactor 233 of the relay 231 establishes a circuit for connecting the main motor 54 in circuit relation with the armature of the main generator 76.

As explained with reference to Figure 2, the relays 227 and 228 are designed to govern the transition relays 159 and 231 so that the transition is not effected until the differential voltage between the threading generator 77 and the main generator 76 is less than 5 volts, being substantially the condition when the movable part 483 of the motor operated rheostat passes between the contacts 641 and 642. The relay 227 and 228 are connected in circuit relation for energization through the contactor 653 of the relay 223, which relay is energized through the contactors 554 and 556 of the relay 535 upon the depressing of the run fast push button 150. The circuit for energizing the relay 223 may be traced as follows; beginning with the vertical conductor 309 on Figure 4 current flows through conductor 548, contactor 554 of the relay 535, conductor 555, contactor 556 of the relay 535, conductors 557 and 569, the bridging conductor 568, through the series of connected contact points of the motor operated rheostat to contact point 658, conductor 654, resistor 655, conductor 657, the winding of the relay 223 and conductor 658 to the common conductor 310 on top of Figure 5. During the initial starting of the equipment upon the depressing of the run fast push button 150 the voltage characteristics of the threading generator 77 and the main generator 76 are such that the threading generator has a more rapid voltage rise than the main generator until the neighborhood of 35 to 40 volts is reached at which point the voltages come together. With the wide differential of voltage between the threading generator 76 and the main generator 77 during the early stages of the starting being relatively wide, the relays 227 and 228 are energized, but just as soon as the voltage of the two generators begin to come together and reach a point of less than 5 volts the two relays 227 and 228 become de-energized which enables the transfer relays 159 and 231 to operate. In other words, so long as the contactor 647 of the relay 228 is open resulting from a differential voltage of more than 5 volts, the relay 231 cannot become energized to connect the armature of the main motor to the armature of the main generator 76. Therefore, the purpose of the relay 228 is to insure that the differential voltage between the threading generator 77 and the main generator 76 is less than 5 volts during the transition period in order to prevent too large a current disturbance upon the main motor which would tend to damage the cloth being printed. The relay 223 is disconnected from being energized just as soon as the movable part 483 of the motor operated rheostat passes to the right beyond the point 658 which means that the relays 228 and 227 are removed from the differential voltage of the threading generator 77 and the main generator 76 under high speed operation where the differential voltage would be large and subject the windings of the relays 227 and 228 to the large current values.

However, before the relay 228 is de-energized by the movable part 483 passing beyond the point 658 a holding circuit is established for energizing the relay 231 through the contact 661. The equipment continues to run with the main motor 54 energized from the main generator 76 and the speed to which the equipment attains is determined by the setting of the pre-set rheostat 561 which governs the position to which the movable part 483 of the motor operated rheostat is moved.

In stopping the equipment, the normal plan is to press the run slow push button until the speed of the equipment is brought down to a low speed and then depress the rapid stop push button 447. Just as soon as the run slow push button 149 is depressed for reducing the speed of the equipment to a low speed, the relays 535 is de-energized with the opening of the auxiliary contact 540 of the run slow push button 149. Upon the de-energization of the relay 535 all of the circuits for energizing the windings of the polarized relays 559 and 563 are likewise de-energized and a new circuit is set up for energizing the relay 596 for operating the pilot motor 554 in backward direction to bring the movable part 483 to its standstill position. The new circuit for energizing the relay 596 may be traced as follows; beginning with the vertical common conductor 309 on Figure 4, current flows through conductor 430, the slide bar 431, conductors 486 and 662, the contactor 663 of the relay 535, conductor 664, the slow limit switch 637 which is closed, the winding of the relay 596, the conductor 640, and the fixed resistor 632 to the common conductor 310. The motor 554 upon the energization of the relay 596 operates in the backward direction to operate the movable part 483 toward the standstill position and just as soon as the movable part 483 engages the dog 638 at the standstill position the limit switch 637 opens and de-energizes the relay 596 for stopping the motor 554. As the equipment slows down, and as the movable part 483 passes from the contact point 642 to the contact point 641 a circuit is established for energizing the relay 159 by taking care of the transition from the main generator 76 back to the threading generator 77, provided the relay 227 is de-energized as it will be when the differential voltage between the main generator 76 and the threading generator 77 is less than 5 volts. The circuit for energizing the relay 159 upon the deceleration of the motor operated rheostat may be described as follows; beginning with the vertical common conductor 309 on Figure 4 current flows through the conductor 430, the slide bar 431, the bridging conductor 432 and 510, conductors 512 and 513, the winding of the relay 169, conductor 514, the contactor 515 of the relay 231 which became de-energized just as soon as the movable part 483 passed to the left beyond the contact point 642, conductors 516 and 663, the contactor 664 of the relay 227, conductor 665, contactor 509 of the relay 173, conductors 521 and 498, contactor 499 of the relay 453, and conductor 500 to the common conductor 310. Therefore, upon the deceleration of the equipment the main driving motor 54 is not subjected to any sudden current disturbance incident to the transition from the main generator 76 to the threading generator 77 since the relay 227 prevents the transition taking place unless the differential voltage between the two generators is less than 5 volts.

In the event that an emergency condition arises and the operator desires to stop the equipment immediately he can do so by depressing either one of the rapid stop push buttons 147 which sets up a circuit for operating the pilot motor 554 at a rapid speed in a backward direction toward the standstill position. The high speed operation of the pilot motor 544 is effected by reason of the fact that the relay 450 is de-energized when the rapid stop push button 147 is depressed. The closing of the contact 610 of the relay 450 removes the resistor 608 from across the armature of the motor 554 which means that the motor can run faster towards the stop position. Also, the closing of the contactor 666 of the relay 450 removes the resistance 615 from the circuit which means that additional current can flow through the armature of the motor 544 and increase its speed under the rapid stop condition. The resistor 615 is removed from the circuit through conductor 667, contactor 666 and conductor 668. In addition, the closing of the contactor 669 of the relay 450 inserts a resistance 670 in parallel with the field 606 of the motor 554 to weaken the field of the motor which likewise tends to make the motor run faster under the rapid stop condition. Under the rapid stop condition the main motor 54 continues to be energized from the main generator 76 until it stops and is not transferred to the threading generator 77 as the movable part passes the gap between the contact point 642 and 641. This transition is eliminated under the rapid stop condition by bridging the gap between the contact point 641 and 642 by a circuit which extends from the contact point 641 through conductor 512, contactor 671 of relay 452 which is now de-energized, conductor 672, resistor 673, conductor 674, contactor 675 of the relay 231, conductor 644 to the slide bar 643 over to the contact point 642. As the movable part 483 approaches the standstill position and breaks contact with the contact point 673 a circuit would normally be disrupted for de-energizing the relay 453 which must be maintained to keep the relay 231 energized for keeping the main motor 54 in circuit relation with the main generator 76 until the motor completely comes to rest. Therefore, a circuit is established with the standstill contact point 433 which keeps the relay 231 energized until the movable part 483 reaches the standstill contact point 433. The circuit may be traced as follows; beginning with the bridging conductor 432 the circuit extends through sliding bar 431, conductors 486 and 662, the contactor 663 of the relay 535, conductor 664, the slow limit switch 637, conductor 672 and 673, contactor 674 of the relay 453, conductor 675, contactor 676 of the relay 452, conductors 677 and 678, resistor 889, the winding of the relay 453 and conductor 488 to the common conductor 310. Accordingly, under the condition of rapid stop the relay 453 continues to be energized until the movable part 483 of the motor operated rheostat reaches its standstill position.

The jogging of the electrical equipment is accomplished through a jog push button 148 and two relays 682 and 683. When the jog push button 148 is in its normal undepressed position, a circuit is established for energizing the relay 682, which circuit extends to conductor 684, resistor 685, the winding of the relay 682, conductors 686 and 687, the contactor 688 of the relay 683, conductors 689, 690 and 475, contactor 476 of the relay 451, conductor 477 to the contactor 478 of the relay 240 on Figure 3 and conductors 479, 480, 340, 341 and 342 to the common conductor 310. A closed contact 692 of the energized relay 682 bridges the jog push button 148 through conductors 695 and 684. Depression of the jog push button 148 establishes a circuit for energizing the relay 683 which circuit may be traced as follows; beginning with the depressed jog push button current flows through conductor 695, contactor 693 of the relay 682, conductor 694, the winding of the relay 683, conductor 687, contactor 688 of the relay 683, conductor 689, 690 and 475, contactor 476 of the relay 451, conductor 477 to the contactor 478 of the relay 240 on Figure 3, conductor 479, 480, 340, 341 and 342 to the common conductor 310. The energization of the relay 683 establishes a circuit for paralleling the contact 499 of the relay 453 which is de-energized in the jogging position, the parallel circuit extends from the left hand terminal of the contactor 499 through conductors 498, 497, 496 and 697, contactor 698 of the relay 683, conductors 699, 319, 320, 321, 322, 323, to the common conductor 310 and back to the opposite terminal of the contactor 499 through the conductor 500. Therefore, the contactor 698 of the relay makes a circuit, paralleling the contactor 499 to keep the relays 307, 173, 180, 159, 156 energized to operate the electric motors under the jogging condition. As diagrammatically shown, the contactor 688 of the relay 683 is designed to be a time opening and an instantaneous closing contactor by the action of a dash-pot 701, a spring 702 and a cross pin 703. Hence, after a time delay upon the energization of the relay 683, the contactor 688 opens and disrupts the circuit for energizing itself, as well as the relay 682, which in turn stops the equipment. In other words, under the jogging condition, the equipment operates only during the time interval effected by the time delayed action of the contact 688 of the relay 683, regardless how long the operation may keep the jog push button depressed. The equipment operates the same period of time, even though the operator just touches the jog push button 149 for an instant. In this case a holding circuit is established around the jog push button 149 to keep the equipment energized until the time delay contactor 688 operates to de-energize the equipment. The holding circuit extends from the right terminal of the jog push button through conductor 695, contactor 693 of the relay 682, conductor 694, contactor 704 of the relay 683, conductor 700, contactor 692 of the relay 682 and through the conductor 465 to the left terminal of the jog push button 148. Under the jogging condition the main printing cylinder 16 may move about one inch each time that the jog push button is depressed.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In combination with at least two rotating elements in which one of said rotating elements constitutes a lead element and the other rotating element a follow element between which material passes, an electric motor, driving transmitting means for transmitting power from the electric motor to the follow rotating element, said driving transmitting means having interchangeable driving elements which vary the relative speed between the electric motor and the follow rotating element, synchronous transmitter means driven in response to the speed of the follow rotating element, synchronous receiver means synchronously connected to the synchronous transmitter means, means for driving the lead rotating element, a differentially driven regulator having electrical means for influencing the speed of said motor to compensate for said relative speed variations between the motor and the follow rotating element incident to changing said interchangeable driving elements to keep the speed of the follow rotating element in synchrony with the speed of the lead rotating element, first drive means for driving the regulator in response to the speed of the synchronous receiver means and second drive means for driving the regulator in response to the speed of the lead rotating element.

2. In combination, with a cloth printing machine having a printing cylinder driven by interchangeable engraving rolls of variable diameters and drying cylinder means to which the cloth passes after leaving the printing cylinder, an electric motor for driving the engraving rolls and the printing cylinder, synchronous transmitter means driven in response to the speed of the printing cylinder, synchronous receiver means synchronously connected to the synchronous transmitter means, means for driving the drying cylinder means, a differentially driven regulator having electrical means for influencing the speed of said motor to compensate for relative speed variations between the motor and the printing cylinder incident to changing said interchangeable engraving rolls to keep the speed of the printing cylinder in synchrony with the speed of the drying cylinder means, first drive means for driving the regulator in response to the speed of the synchronous receiver means, and second drive means for driving the regulator in response to the speed of the drying cylinder means.

3. In combination, with a cloth printing machine having a printing cylinder driven by interchangeable engraving rolls of variable diameters and drying cylinder means to which the cloth passes after leaving the printing cylinder, an electric motor for driving the engraving rolls and the printing cylinder, synchronous transmitter means driven in response to the speed of the printing cylinder, synchronous receiver means synchronously connected to the synchronous transmitter means, means for driving the drying cylinder means, a differentially driven regulator having electrical means for influencing the speed of said motor to compensate for relative speed variations between the motor and the printing cylinder incident to changing said interchangeable engraving rolls to keep the speed of the printing cylinder in synchrony with the speed of the drying cylinder means, first drive means for driving the regulator in response to the speed of the synchronous receiver means, and second drive means for driving the regulator in response to the speed of the drying cylinder means, one of said drive means having variable speed means to regulate the slack of the cloth between the printing cylinder and the drying cylinder means.

4. In an electrical control system for a machine for processing a strip of material having at least two rotating elements over which the material passes, means for driving one of the rotating elements and the material engaged thereby, a dynamo-electric machine connected to the other rotating element to govern the lineal speed of the material engaged by the said other rotating element, a first generator, a second generator, said dynamo-electric machine and said generators each having an armature and a field, electrical means for energizing the said fields, circuit means for connecting the armatures of the motor and the generators in series, variable resistance means in both the fields of the dynamo-electric machine and the second generator to govern the action of the dynamo-electric machine and thus the lineal speed of the material engaged by said other rotating element, and dancer roll means responsive to the relative speeds of the material at the two rotating elements for operating the variable resistance means to keep the lineal speed of the material at the said other rotating element substantially the same as the speed of the material at the said one of the rotating elements.

5. In an electrical control system for a machine for processing a strip of material having at least two rotating elements over which the material passes, means for driving one of the rotating elements and the material engaged thereby, a dynamo-electric machine connected to the other rotating element to govern the lineal speed of the material engaged by the said other rotating element, a first generator, a second generator, said dynamo-electric machine and said generators each having an armature and a field, electrical means for energizing the said fields, circuit means for connecting the armatures of the dynamo-electric machine and the generators in series, variable resistance means in the field of the second generator to govern the action of the dynamo-electric machine and thus the lineal speed of the material engaged by said other rotating element, and dancer roll means responsive to the relative speeds of the material at the two rotating elements for operating the variable resistance means to keep the lineal speed of the material at the said other rotating element substantially the same as the speed of the material at the said one of the rotating elements.

6. In an electrical control system, a dynamo-electric machine, a first generator, a buck-and-boost generator, said dynamo-electric machine and said generators each having an armature and a field, electrical means for energizing the said fields, circuit means for connecting the armatures of the dynamo-electric machine and the generators in series, variable resistance means in both the fields of the dynamo-electric machine and the second generator to vary the action of the dynamo-electric machine, and means for operating the variable resistance means.

7. In combination, with a cloth printing machine having a printing cylinder driven by interchangeable engraving rolls of variable diameters and drying cylinder means, an electric motor for driving the engraving rolls and the printing cylinder, drive means for driving the drying cylinder means, and means governed in response to the linear speed of the drying cylinder means and to the linear speed of the printing cylinder for varying the speed of the electric motor.

8. In combination, with a cloth printing machine having a printing cylinder driven by interchangeable engraving rolls of variable diameters and drying cylinder means, a first electric motor for driving the drying cylinder means, a second electric motor for driving the engraving rolls and the printing cylinder, and speed control means for making the first electric motor function as the lead motor and the second electric motor function as the follow motor to automatically compensate for relative speed variations between the second motor and the printing cylinder incident to changing said interchangeable engraving rolls to keep the linear speed of the printing cylinder in synchrony with the linear speed of the drying cylinder means.

9. In combination, with a first and a second rotating element, a first motor for driving the first rotating element, a second motor for driving the second rotating element, means for effecting a speed variation between the second motor and the second rotating element, and speed control means responsive to the linear speed of both the first and second rotating elements for making the first motor function as the lead motor and the second motor function as the follow motor to automatically compensate for relative speed variations between the second motor and the second rotating element to keep the linear speed of the second rotating element in synchrony with the linear speed of the first rotating element.

10. In combination, with a cloth printing machine having a printing cylinder driven by interchangeable engraving rolls of variable diameters and drying cylinder means, a first electric motor for driving the drying cylinder means, a second electric motor for driving the engraving rolls and the printing cylinder, and speed control means for making the first electric motor function as the lead motor and the second electric motor function as the follow motor to automatically compensate for relative speed variations between the second motor and the printing cylinder incident to changing said interchangeable engraving rolls to keep the linear speed of the printing cylinder in synchrony with the linear speed of the drying cylinder means, first generator means for energizing the first motor, second generator means for energizing the second motor, and means for varying the generated voltage of the first and second generator means.

11. In a machine for processing a strip of material having a lead rotating element over which the material passes and at least two follow rotating elements governed by the lead rotating element, of which one of the follow rotating elements is a main drive element for the material and of which another follow element is an auxiliary element governing the speed of the material, an electrical control system for the machine comprising, in combination, a motor for driving the main drive follow element and the material engaged thereby, a main generator for supplying electrical energy to the motor, a dynamo-electric machine connected to the auxiliary element to govern the lineal speed of the material engaged by the auxiliary element, an auxiliary generator for supplying electrical energy to the dynamo-electric machine, common means for governing the generators and thus the speed of the motor and the action of the dynamo-electric machine, first control means independent of the common means and responsive to the lead element for modifying the speed of the motor to keep the lineal speed of the material at the main drive follow element substantially the same as the lineal speed of the material at the lead element, and second control means independent of the common means and responsive to the relative lineal speeds of the material at the main drive follow element and at the auxiliary follow element for modifying the action of the dynamo-electric machine to keep the lineal speed of the material at the auxiliary follow element substantially the same as the lineal speed of the material at the lead element and at the main drive follow element.

12. In a machine for processing a strip of material having a lead rotating element over which the material passes and at least two follow rotating elements governed by the lead rotating element, of which one of the follow rotating elements is a main drive element for the material and of which another follow element is an auxiliary element governing the speed of the material, an electrical control system for the machine comprising, in combination, an electric motor having a field for driving the main drive follow element and the material engaged thereby, a main generator having a field for supplying electrical energy to the electric motor, a dynamo-electric machine having a field and an armature connected to the auxiliary element to govern the lineal speed of the material engaged by the auxiliary element, an auxiliary generator having a field and an armature for supplying electrical energy to the dynamo-electric machine, common means for governing the fields of the generators and thus the speed of the motor and the action of the dynamo-electric machine, first control means independent of the common means and responsive to the lead element for modifying the speed of the motor to keep the lineal speed of the material at the main drive follow element substantially the same as the lineal speed of the material at the lead element, said first control means comprising synchronous transmitter means driven in response to the speed of the main drive follow element, receiver means synchronously connected to the synchronous transmitter means, a differentially driven regulator having electrical resistance means for influencing the fields of the main generator and the motor to modify the speed of the motor, first drive means for driving the regulator in response to the speed of the synchronous receiver means and second drive means for driving the regulator in response to the speed of the lead rotating element, second control means independent of the common means and responsive to the relative lineal speeds of the material at the main drive follow element and at the auxiliary follow element for modifying the action of the dynamo-electric machine to keep the lineal speed of the material at the auxiliary follow element substantially the same as the lineal speed of the material at the lead element and at the main drive follow element, said second control means comprising a buck-and-boost generator having a field and an armature, circuit means for connecting the armatures of the dynamo-electric machine, the buck-and-boost generator and the auxiliary generator in series, variable resistance means in both the fields of the dynamo-electric machine and the buck-and-boost generator, and dancer roll means responsive to the relative lineal speeds of the material at the main drive follow element and at the auxiliary follow element for operating the variable resistance means.

13. In combination with at least two rotating elements in which one of said rotating elements constitutes a governing element and the other rotating element a governed element between which material passes, an electric motor, driving transmitting means for transmitting power from the electric motor to the governed rotating element, said driving transmitting means having speed change means which varies the relative speed between the electric motor and the governed rotating element, means for driving the governing rotating element, and means governed in response to the linear speed of the governing rotating element and to the linear speed of the governed rotating element to automatically compensate for relative speed variations between the electric motor and the governed rotating element incident to speed variations effected by the speed change means to keep the linear speed of the governed rotating element in synchrony with the linear speed of the governing rotating element.

14. In combination with at least two rotating elements in which one of said rotating elements constitutes a governing element and the other rotating element a governed element between which material passes, an electric motor, driving transmitting means for transmitting power from the electric motor to the governed rotating element, said driving transmitting means having speed change means which varies the relative speed between the electric motor and the governed rotating element, means for driving the governing rotating element, differentially driven regulator means having electrical means for influencing the speed of said motor, and means governed in response to the linear speed of the governing rotating element and to the linear speed of the governed rotating element to automatically compensate for relative speed variations between the electric motor and the governed rotating element incident to speed variations effected by the speed change means to keep the linear speed of the governed rotating element in synchrony with the linear speed of the governing rotating element.

15. In combination with at least two rotating elements in which one of said rotating elements constitutes a governing element and the other rotating element a governed element between which material passes, an electric motor, driving transmitting means for transmitting power from the electric motor to the governed rotating element, said driving transmitting means having speed change means which varies the relative speed between the electric motor and the governed rotating element, means for driving the governing rotating element, synchronous transmitter means driven in response to the linear speed of one of said rotating elements, synchronous receiver means synchronously connected to the synchronous transmitter means, a differentially driven regulator having electrical means for influencing the speed of the electric motor, and means for differentially driving the regulator in response to both the speed of the synchronous receiver means and the linear speed of the other of said rotating elements to automatically compensate for relative speed variations between the electric motor and the governed rotating element incident to speed variations effected by the speed change means to keep the linear speed of the governed rotating element in synchrony with the linear speed of the governing rotating element.

16. In an electrical control system for a machine having at least two rotating elements upon which material passes, means for driving one of the rotating elements and the material engaged thereby, a dynamo-electric machine connected to the other rotating element to govern the linear speed of the material engaged by the said other rotating element, a first generator, a buck-and-boost generator, said dynamo-electric machine and said generators each having an armature and a field, electrical means for energizing the said fields, circuit means for connecting the armatures of the dynamo-electric machine and the generators in series, variable resistance means in both the fields of the dynamo-electric machine and the buck-and-boost generator to vary the action of the dynamo-electric machine and thus the linear speed of the material engaged by said other rotating element and means responsive to the travel of the material for operating the variable resistance means to keep the linear speed of the material at the said other rotating element substantially the same as the speed of the material at the said one of the rotating elements.

17. In an electrical control system for a machine having at least two rotating elements upon which material passes, means for driving one of the rotating elements and the material engaged thereby, a dynamo-electric machine connected to the other rotating element to govern the linear speed of the material engaged by the said other rotating element, a first generator, a buck-and-boost generator, said dynamo-electric machine and said generators each having an armature and a field, electrical means for energizing the said fields, circuit means for connecting the armatures of the dynamo-electric machine and the generators in series, variable resistance means in both the fields of the dynamo-electric machine and the buck-and-boost generator to vary the action of the dynamo-electric machine and thus the linear speed of the material engaged by said other rotating element and means engaging the material for operating the variable resistance means to keep the linear speed of the material at the said other rotating element substantially the same as the speed of the material at the said one of the rotating elements.

18. In an electrical control system for a machine having at least two rotating elements upon which material passes, means for driving one of the rotating elements and the material engaged thereby, a dynamo-electric machine connected to the other rotating element to govern the linear speed of the material engaged by the said other rotating element, a supply of electric current, a buck-and-boost generator adapted to oppose or add to the voltage of the said supply, said dynamo-electric machine and said generator each having an armature and a field, electrical means for energizing the said fields, circuit means for connecting the armatures of the dynamo-electric machine and the buck-and-boost generator in series with the said supply, variable resistance means in both the fields of the dynamo-electric machine and the buck-and-boost generator to vary the action of the dynamo-electric machine and thus the linear speed of the material engaged by said other rotating element and means responsive to the travel of the material for operating the variable resistance means to keep the linear speed of the material at the said other rotating element substantially the same as the speed of the material at the said one of the rotating elements.

19. In combination, with a cloth printing machine having at least a printing cylinder driven by interchangeable engraving rolls of variable diameters and a roll spaced from the printing cylinder upon which the cloth passes, an electric motor for driving the engraving rolls and the printing cylinder, drive means for driving the said roll, and means governed in response to the lineal speed of the said roll and to the lineal speed of the printing cylinder for varying the speed of the electric motor.

20. In combination, with a cloth printing machine having at least a printing cylinder driven by interchangeable engraving rolls of variable diameters and a device spaced from the printing cylinder and bearing a direct relation to the speed of the cloth, an electric motor for driving the engraving rolls and the printing cylinder, drive means for driving the said device, and means governed in response to the lineal speed of the said device and to the lineal speed of the printing cylinder for varying the speed of the electric motor.

21. In combination, with a cloth printing machine having at least a printing cylinder driven by interchangeable engraving rolls of variable diameters and a device spaced from the printing cylinder and bearing a direct relation to the speed of the cloth, a first electric motor for driving the said device, a second electric motor for driving the engraving rolls and the printing cylinder, and speed control means for making the first electric motor function as a governing motor and the second electric motor function as a governed motor to automatically compensate for relative speed variations between the second motor and the printing cylinder incident to changing said interchangeable engraving rolls to keep the linear speed of the printing cylinder in synchrony with the linear speed of the said device.

22. In combination, with a cloth printing machine having at least a printing cylinder driven by interchangeable engraving rolls of variable diameters and a device spaced from the printing cylinder and bearing a direct relation to the speed of the cloth, a first electric motor for driving the said device, a second electric motor for driving the engraving rolls and the printing cylinder, and speed control means responsive to the linear speed of both the printing cylinder and the said device for making the first electric motor function as a governing motor and the second electric motor function as a governed motor to automatically compensate for relative speed variations between the second motor and the printing cylinder incident to changing said interchangeable engraving rolls to keep the linear speed of the printing cylinder in synchrony with the linear speed of the said device.

23. In a machine having a governing rotating element and at least two governed rotating elements upon which material passes, of which one of the governed rotating elements is a main drive element for the material and of which the other governed element is an auxiliary element, an electrical control system for the machine comprising, in combination, a motor for driving the main drive element and the material engaged thereby, a dynamo-electric machine connected to the auxiliary element to govern the linear speed of the material engaged by the auxiliary element, first control means responsive to the relative linear speeds of the material at the governing rotating element and at the main drive element to control the speed of the motor to keep the linear speed of the material at the main drive element substantially the same as the linear speed of the material at the governing rotating element, and second control means responsive to the relative linear speeds of the material at the main drive element and at the auxiliary element to control the action of the dynamo-electric machine to keep the linear speed of the material at the auxiliary element substantially the same as the linear speed of the material at the governing and at the main drive element.

24. A printing apparatus comprising a printing machine having a printing roll of indeterminate size, first power mechanism including a first motor for driving the said printing roll and causing it to move material which is being printed to the printing zone at a rate determined by the roll size, second power mechanism including a second motor for moving the material being printed at a point remote from the printing zone, a speed reference unit independent of both of said motors which moves in an invariable speed ratio relative to the speed of the material being printed in the printing zone as caused by said printing roll, a speed control device responsive to said speed reference unit for governing the speed of said first motor and keeping the linear speed of the material being printed at the printing zone substantially the same as the linear speed of the material at the remote point where it is driven by the second motor, so that the material being printed is held under a substantially uniform tension between the said remote point and said printing roll.

25. In combination with a printing machine having at least a printing cylinder driven by an engraving roll of indeterminate diameter, a device spaced from the printing cylinder and bearing a direct relation to the speed of the material being printed, a first electric motor for driving the engraving roll and the printing cylinder, a second electric motor for driving the said device, and speed control means responsive to the linear speed of both the material in the printing machine and in the said device for making said first electric motor function as a governed motor to keep the linear speed of the material in the printing machine substantially the same as that at which it moves in the said device as driven by the second motor.

ROSCOE H. SMITH.
LEON M. DUNNING.
LLOYD E. MILLER.